(12) United States Patent
Shooter et al.

(10) Patent No.: US 10,442,884 B2
(45) Date of Patent: *Oct. 15, 2019

(54) DISPERSANTS WITH MULTIPLE AROMATIC IMIDE ANCHOR GROUPS

(71) Applicant: Lubrizol Advanced Materials, Inc., Cleveland, OH (US)

(72) Inventors: Andrew J. Shooter, Wilmslow (GB); Dean Thetford, Norden (GB); Stuart N Richards, Frodsham (GB); Robert A. Jennings, Salford (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,564

(22) Filed: Apr. 28, 2016

(65) Prior Publication Data

US 2016/0237196 A1     Aug. 18, 2016

Related U.S. Application Data

(63) Continuation-in-part of application No. PCT/US2014/062867, filed on Oct. 29, 2014.

(60) Provisional application No. 61/898,647, filed on Nov. 1, 2013.

(51) Int. Cl.

| | | |
|---|---|---|
| C09D 11/00 | (2014.01) |
| C08G 18/64 | (2006.01) |
| C08G 18/02 | (2006.01) |
| C09D 11/322 | (2014.01) |
| C09D 11/037 | (2014.01) |
| C08G 18/38 | (2006.01) |
| C09D 179/08 | (2006.01) |
| C09D 11/102 | (2014.01) |
| C08G 18/79 | (2006.01) |
| C09D 11/326 | (2014.01) |
| C08G 18/28 | (2006.01) |
| C08G 18/42 | (2006.01) |
| C09D 11/10 | (2014.01) |
| C08L 79/08 | (2006.01) |

(52) U.S. Cl.

CPC ......... *C08G 18/025* (2013.01); *C08G 18/284* (2013.01); *C08G 18/285* (2013.01); *C08G 18/3846* (2013.01); *C08G 18/4277* (2013.01); *C08G 18/6438* (2013.01); *C08G 18/792* (2013.01); *C08G 18/794* (2013.01); *C08L 79/08* (2013.01); *C09D 11/037* (2013.01); *C09D 11/10* (2013.01); *C09D 11/102* (2013.01); *C09D 11/322* (2013.01); *C09D 11/326* (2013.01); *C09D 179/08* (2013.01)

(58) Field of Classification Search

CPC .............. C08G 18/3846; C08G 18/285; C08G 18/6438; C08G 18/284; C09D 11/102; C09D 11/322; C09D 11/037; C09D 179/08

See application file for complete search history.

(56) References Cited

U.S. PATENT DOCUMENTS

| | | | | |
|---|---|---|---|---|
| 3,510,453 | A | * | 5/1970 | Geiser .................. C08G 18/678 521/159 |
| 4,585,806 | A | * | 4/1986 | Barda ................ C08G 18/3846 252/609 |
| 5,688,312 | A | | 11/1997 | Sacripante et al. |
| 6,440,207 | B1 | | 8/2002 | Schulz et al. |
| 7,265,197 | B2 | | 9/2007 | Huber et al. |
| 2010/0132989 | A1 | * | 6/2010 | Fujihara .................. C08G 18/10 174/258 |
| 2010/0240825 | A1 | | 9/2010 | Shimohara et al. |
| 2011/0294929 | A1 | * | 12/2011 | Cristadoro ........... C08G 18/346 524/94 |

FOREIGN PATENT DOCUMENTS

| | | |
|---|---|---|
| JP | 2013053200 A | 3/2013 |
| WO | 2007139980 A1 | 12/2007 |
| WO | 2008028954 A1 | 3/2008 |
| WO | 2013165770 A1 | 11/2013 |
| WO | 2013165792 A1 | 11/2013 |

* cited by examiner

*Primary Examiner* — Michael L Leonard

(74) *Attorney, Agent, or Firm* — Samuel B. Laferty; Teresan W. Gilbert

(57) ABSTRACT

A polyurethane dispersant is described that comprises a reaction product of a polyisocyanate with a) a component supplying a anchoring imide group wherein the carbonyl groups of the imide are bonded to a fused or non-fused aromatic ring, b) at least one solvent-solubilizing chain, and other optional components to build molecular weight or modify the interaction of the dispersant with various particulates or continuous media.

15 Claims, No Drawings

DISPERSANTS WITH MULTIPLE AROMATIC IMIDE ANCHOR GROUPS

CROSS REFERENCE TO RELATED APPLICATION

This application claims priority from PCT Application Serial No.: PCT/US14/062867 filed on Oct. 29, 2014, which claims the benefit of U.S. Provisional Application No. 61/898,647 filed on Nov. 1, 2013.

FIELD OF INVENTION

The present invention relates to a dispersant with one or more imide groups pendant from aromatic rings or fused aromatic rings attached to each dispersant molecule. The imide groups pendant from aromatic or fused aromatic rings give particularly good anchoring effect and having multiple such groups per dispersant molecule is desirable. Compositions using said dispersant in combination with an aqueous, polar or non-polar organic medium and a particulate solid are also disclosed and claimed.

BACKGROUND OF THE INVENTION

Many formulations such as inks, paints, millbases and plastics materials require effective dispersants for uniformly distributing a particulate solid in a polar organic medium or a non-polar organic medium. For inks, it is desirable for ink manufacturers to generate printed products of high resolution and quality. The adaptability of printing process to cater for the ever widening range of base substrates, resins and pigments is a challenge. The pigment dispersion should be compatible with the different formulations used to ensure good adhesion and resistance of the final coating. Poor pigment dispersion or stabilisation can result in agglomeration or settling within the polar organic liquid medium or a non-polar organic liquid medium (e.g., ink or coating) lowering the gloss and aesthetic appeal.

U.S. Pat. No. 7,265,197 discloses dispersing pigments in ink compositions with a dispersant having formula:

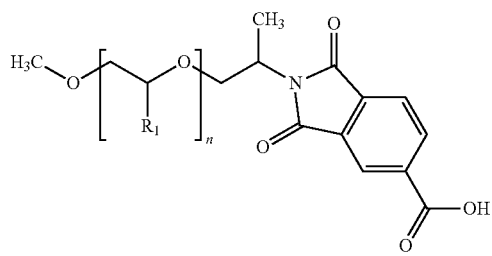

where $R_1$ is individually selected from the group consisting of H and CH3, and n is an integer from 4 to 400).

International publication WO 2008/028954 discloses imide dispersant compounds containing terminal acidic groups in both a polar and a non-polar organic medium, where the dispersant compound is represented by the structure

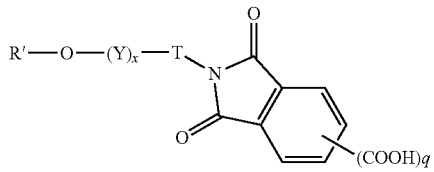

where T is $-(CH_2)_3-$ or $-CH_2CH(CH_3)-$; R' is H or C1-50-optionally substituted hydrocarbyl group, or $C_{1-50}$-optionally substituted hydrocarbonyl; Y is $C_{2-4}$-alkyleneoxy; x is 2 to 90; and q is 1 or 2, with the proviso that in Formula (1a), when q is 1, T is $-(CH_2)_3-$, and when q is 2, T is $-(CH_2)_3-$ or $-CH_2CH(CH_3)-$.

U.S. Pat. No. 5,688,312 discloses an ink composition comprised of a colourant and an imide or bisimide with a viscosity of from about 1 centipoise to about 10 centipoise at a temperature of from about 125 to about 180° C. The imide or bisimide may be prepared by reacting phthalic anhydride and a mono- or di-amine. The monoamine may be for example dodecylamine, or stearylamine. The diamine may be 1,12-dodecanediamine.

International Patent Application WO 2007/139980 discloses a reaction product of at least one di-anhydride with at least two reactants which are different from each other, each of which reactants contains a primary or secondary amino, hydroxyl or thiol functional group, and at least one of which reactants is polymeric. The reaction product is useful in compositions such as inks and coatings.

U.S. Pat. No. 6,440,207 discloses a process for preparing dispersible dry organic pigments for aqueous systems by (a) milling a mixture containing (1) one or more organic pigments, (2) at least about 1% by weight, relative to the organic pigment, of one or more aromatic polyalkylene oxide dispersants, (3) 0 to about 10 parts by weight, relative to the organic pigment, of a milling liquid in which the organic pigment is substantially insoluble, (4) 0 to about 50% by weight, relative to the organic pigment, of one or more milling additives other than dispersant (2), and (5) 0 to about 20% by weight, relative to the organic pigment, of one or more surface treatment additives; (b) optionally, adding to the milled pigment (6) one or more liquids in which the organic pigment is substantially insoluble in amounts such that the total solids content is not reduced below about 10%, and (7) one or more multivalent metal salts and/or one or more quaternary ammonium salt; and (c) isolating the milled organic pigment. The aromatic polyalkylene oxide dispersant may be prepared by reacting in an autoclave containing 250 g of deionized water 19.8 (0.100 mol) of 1,8-naphthalic anhydride and 105 (0.105 mol) of Jeffamine™XTJ-506 (83 wt % ethylene oxide, 17 wt % propylene oxide). The autoclave was sealed, heated with stirring to 150° C., and maintained at 150° C. for five hours. After the reaction had cooled, the resultant brown liquid was discharged into a beaker to which was then added 15 g of decolourizing charcoal. After stirring overnight, the suspension was filtered and the filter cake washed with water, yielding approximately 500 g of an amber-coloured filtrate having a 23.63% solids content. The dry pigment can be employed in water-based paint systems.

International Patent application PCT/US13/038114, filed 25 Apr. 2013, entitled "Aromatic Dispersant Composition" (by Shooter, Thetford and Richards) discloses a polymer comprising a polymer chain having at least one non-fused aromatic imide pendant group, wherein the polymer is represented by formula:

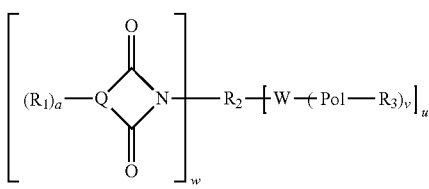

wherein Pol is a homopolymer chain or a copolymer chain, wherein the polymer chain is selected from the group consisting essentially of a poly(ether), poly(ester), poly(ester amide), poly(amide), poly(alkylene), and mixtures thereof, Q is a non-fused aromatic ring containing 4n+2 π-electrons, wherein n=2 or more, and Q is bonded to the imide group in such a way to form a 5 or 6 membered imide ring. Further disclosed is a millbase, paint or ink composition comprising a particulate solid, a non-polar organic medium, and the polymer disclosed therein.

International Patent application PCT/US13/037928, filed 24 Apr. 2013, entitled "Aromatic Dispersant Composition" (by Shooter, Thetford and Richards) discloses a polymer comprising a polymer chain having at least one fused aromatic imide pendant group, wherein the polymer is represented by formula:

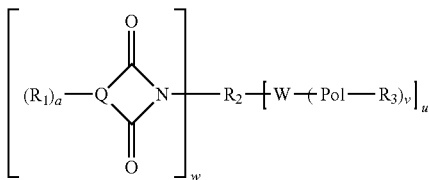

wherein Pol may be a homopolymer chain of ethylene oxide or a copolymer chain of ethylene oxide, wherein the ethylene oxide constitutes 40 wt % to 99.99 wt % of the copolymer chain; and Q may be a non-fused aromatic ring containing 4n+2 π-electrons, and Q is bonded to the imide group in such a way to form a 5 or 6 membered imide ring. Also disclosed is a millbase, paint or ink composition comprising a particulate solid (typically a pigment or filler), an aqueous medium, and the polymer chain disclosed therein.

SUMMARY OF THE INVENTION

The disclosed technology provides for at least one imide group and in another embodiment four or more imide groups attached to a dispersant molecule to provide enhanced anchoring to various particulate material which is dispersed in a polar or nonpolar organic medium. The imide groups are aromatic imide groups meaning that the carbonyl groups of the imide ring are chemically bonded to a single or fused aromatic ring.

One objective of the present invention is to provide compounds that are capable of improving the colour strength or other tinctorial properties, increasing a particulate solid load, and/or forming improved dispersions, having improved brightness of the final composition while also producing a composition with reduced viscosity good dispersion stability, reduced particle size and reduced particle size distribution (typically reduced to an average of 150 nm or less, for example in the range of 70-135 nm), reduced haze, improved gloss, and increased jetness (especially when the composition is black). The composition of the present invention may also be stable under ambient storage, and high temperature storage conditions providing reduced discolouration/yellowing of final coatings.

DETAILED DESCRIPTION OF THE INVENTION

Various preferred features and embodiments will be described below by way of non-limiting illustration.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

The polymer of the invention herein is useful as a dispersant for various small particle dispersions such as suspendable pigments and particulates in various aqueous, polar and non-polar media. While not wishing to be bound by theory the one or more imide groups per polymer help in anchoring the polymer to some pigments or particulates which favorably interact with the aromatic group of the imide and/or with the imide group itself. The size and location on the polymer (Pol) with respect to the size and location of the imide groups and their accompanying aromatic group is used to optimize the potential anchoring of the polymer to pigments and/or dispersants.

A polymer comprising a polymer chain having at least one and in another embodiment at least two, three or four terminal and/or pendant imide groups, wherein each imide group is chemically bonded to an aromatic ring (either a single aromatic ring or a fused aromatic ring), the polymer is represented by formula (1):

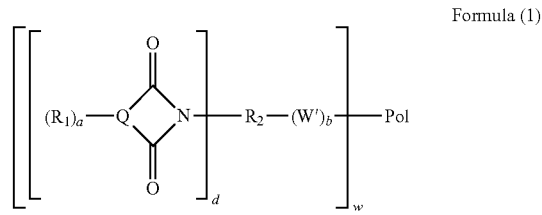

Formula (1)

wherein each variable is independently each time it occurs as follow: $R_1$ may be a substituent on Q ring in any position available for bonding to a substituent group and $R_1$ may be independently represented by one or more of H, or an electron withdrawing group (such as —$NO_2$, —$SO_2NR'_2$, —C(O)R', —$SO_3M$, halo e.g., —Cl or —Br, —$NH_2$, or —OR'), or an electron releasing group (such as an alkyl group of 1 to 3 carbon atoms e.g., —$CH_3$), (typically when $R_1$ may be other than H; the number of non-H substituted groups on Q is defined by a which may be 0 to 2, 0 to 1, 0, or 1), more preferably $R_1$ may be —H and optionally —Cl, —Br, —$SO_3M$ or —$NO_2$; wherein M can be H, a metal cation, $NR'_4^+$, or mixtures thereof; each R' can independently be —H, an optionally-substituted alkyl typically containing 1 to 20, or 1 to 10 carbon atoms, and the substituent of R' may be hydroxyl or halo (typically Cl or Br) or mixtures thereof; desirably the substituent(s) $R_1$ on the aromatic ring (Q) portion of the aromatic imide do not form a second heterocyclic ring and in particular neither form a second imide nor anhydride of a dicarboxylic acid;

Q may be a fused or non-fused aromatic ring containing 4n+2 π-electrons, wherein n=1 or more, (more desirably 1 to 3, or 1 to 2, or 1, or 2), and Q may be bonded to the imide group in such a way to form a 5 or 6 membered imide ring (typically 5 membered);

b is 1 or 2 and when b is 1 the imide group is terminal and attached to the Pol by one chemical bond and when b is 2 the imide group is a side chain attached to Pol by two chemical bonds;

d is 1, 2, or 3; more preferably 1 or 2, and most preferably 1; this means that there is the possibility of 1 to 3 imide groups attached to $R_2$ at different carbon atoms of $R_2$ W' is a residue of the reaction of an amino, hydroxyl or carboxyl group (e.g. a nitrogen, oxygen, or direct bond), preferably amino or hydroxyl of the imide containing group with an isocyanate in a conventional reaction forming a chemical bond between an amino, hydroxy, or carboxyl group with an isocyanate; when b is 2 then one or two of the W' can be derived from a secondary amine reacted with said isocyanate and be in the $R_2$ linking group between the imide and the other W' group, when b is 2 each W' group can be the same or different; w is 1 or more, more desirably from 1, 2, 3 or 4 to 30, more desirably 1, 2, 3, 4 to 25 and preferably 1, 2, 3, 4 to 10 or 20;

$R_2$ may be a $C_1$ to $C_{20}$, or $C_1$ to $C_{12}$, or $C_1$ to $C_6$ hydrocarbylene group or a $C_1$ to $C_{20}$, or $C_1$ to $C_{12}$, or $C_1$ to $C_6$ hydrocarbonylene group (when $R_2$ contains more than 2 carbon atoms, the hydrocarbylene group or hydrocarbonylene group may be linear or branched) or mixtures thereof; $R_2$ may include oxygen and/or nitrogen atoms wherein there is at least 2 carbon atoms per every oxygen or nitrogen of $R_2$, these would include ether, ester, and amide type linkages in $R_2$;

Pol is a polyurethane comprising at least two urethane and/or urea linkages and at least one solvent-solubilizing chain selected from the group of polyether, polyolefin, polyester and polyacrylate pendant terminal chains, or mixtures of said terminal chains. While the formula might be interpreted to indicate a single bond between Pol and W', the bond(s) between Pol and each W' allows for one or more terminal and/or pendant side chain imide groups (as defined by w) to be attached to Pol at one or more locations on Pol and for each imide group to be attached to Pol by one or more bond (as defined by b).

The solvent-solubilizing chain is desirably selected from polyether, polyolefin, polyester or polyacrylate or mixtures thereof. Desirably in this embodiment each solvent-solubilising chain contains only about one group that reacts with isocyanates. Preferably, the group is located at the chain end of the polymer. Preferably, the group is a hydroxyl, or amine group, more preferably a hydroxyl group. These groups that react with isocyanates are also referred to as groups with a Zerewitinoff hydrogen. Zerewitinoff hydrogen in urethane chemistry are known to exist on OH, SH, $CO_2H$, <NH, and $NH_2$. For the purposes of this application, we prefer the hydroxyl and amine groups that are reactive with isocyanates. The preferred number average molecular weights of the polyether, polyolefin, polyester or polyacrylate are 200-20,000, more preferable 300-10,000 g/mole and most preferably 300-5000 g/mole. Even more preferably 700-4000 g/mole in molecular weight. In order to control the structure of the dispersant, it is desirable that solvent-solubilizing chain only has on average one group that reacts with the isocyanates (preferably within 1-17 atoms from a terminus of the chain) under the reaction conditions used to form the dispersant (linear anchoring segments). Having only one isocyanate reactive group per each solvent-solubilizing chain promotes the chain being a terminal solubilising group from the anchoring segment rather than it being a chain extender between two linear anchoring segments.

In one embodiment, the aqueous-solubilising chain is a polyether chain. In one embodiment, the polymer chain may be a Poly(ether) of either (i) a polyethylene oxide homopolymer, or (ii) a copolymer of ethylene oxide and propylene oxide where the % weight of ethylene oxide is greater than the % wt of propylene oxide. Polyethers of this type are typically utilised in water-based compositions.

Monohydroxy polyethers may be prepared by the alkoxylation of alkanols, cycloalkanols and phenols. These polyethers effectively have a molecular weight of 350-3000. The polyethers may be commercially available as poly (ethylene glycol) methyl ethers from Sigma-Aldrich Chemical Company as poly(ethylene glycol) methyl ether, average Mn~350, 550, 750 or 2000. Polyetheramines may be prepared by reacting a mono-alcohol initiator with ethylene oxide only or with a mixture of ethylene oxide and propylene oxide to form an alcohol-ended polymer chain, followed by conversion of the alcohol-ended polymer chain to an amine. The polyether amine may be commercially available as the Surfonamine® amines from Huntsman Corporation. Specific examples of Surfonamine® amines are L-100 (propylene oxide to ethylene oxide mix ratio of 3/19), and L-207 (propylene oxide to ethylene oxide mix ratio of 10/32), L-200 (propylene oxide to ethylene oxide mix ratio of 3/41), and L-300 (propylene oxide to ethylene oxide mix ratio of 8/58). The figures in parentheses are approximate repeat units of propylene oxide, and ethylene oxide respectively. The polyetheramine may be obtained by alkoxylation of aminoalcohols as is described in U.S. Pat. No. 5,879,445 (in particular the disclosure in column 2, line 50 to column 7, line 50).

In one embodiment, the solvent-solubilising chain is a polyether chain. In one embodiment, the polymer chain may be a Poly(ether) of either (i) a polypropylene oxide homopolymer, or (ii) a polybutylene oxide homopolymer, or (iii) a copolymer of propylene oxide and/or butylene oxide optionally with ethylene oxide where the % weight of ethylene oxide is less than the % weight of propylene oxide and/or butylene oxide. Polyethers of this type are typically utilised in solvent media. Polyethers of this type may be prepared by the alkoxylation of alkanols, cycloalkanols and phenols. These polyethers effectively have a molecular weight of 300-3000. The polyethers may be commercially available as poly(propylene glycol) monobutyl ethers, average Mn ~340, 1000 or 2000 or poly(propyleneglycol-co-ethyleneglycol) monobutyl ethers from Sigma-Aldrich Chemical Company or Breox® B-Series PAGs B15, B35, B55, B75, B125, B225, B335 from Cognis. The polyetheramine may be prepared by reacting a mono-alcohol initiator with propylene oxide or butylene oxide only or with a mixture of propylene oxide and ethylene oxide to form an alcohol-ended polymer chain, followed by conversion of the alcohol-ended polymer chain to an amine. The polyether amine may be commercially available as the Surfonamine® amines from Huntsman Corporation. Specific examples of Surfonamine® amines are B60 (ethylene oxide to propylene oxide ratio of 1 to 9), B100 (propylene oxide), B200 (ethylene oxide to propylene oxide ratio of 6 to 29). The figures in parentheses are approximate repeat units of propylene oxide, and ethylene oxide respectively. Polyether copolymers may be random or block copolymers. In one embodiment, preferably the polyether chain is obtainable from polyethylene oxide and/or polypropylene oxide. It is also preferred that the polyether chain of the dispersant is obtainable from a poly($C_{2-4}$-alkylene oxide) mono-$C_{1-18}$-alkyl ether and especially a $C_{1-4}$ alkyl ether such as methyl or butyl ether.

In one embodiment where the solvent-solubilising chain is a polyacrylate (sometimes referred to as polyacrylic), it is preferably obtained from the polymerisation of an alkyl acrylate or alkyl methacrylate. The poly alkyl(meth)acrylate may be prepared by the free radical polymerisation of (meth) acrylate monomer(s). The polyacrylate may be prepared in the presence of a monohydroxyl functional chain transfer agent for example mercaptoalcohols or mercaptoacids to impart mono-functionality. Other vinyl monomers such as styrene, vinyl esters, etc., could be copolymerized into the polyacrylate provided that they do not significantly negatively affect solubility in the selected solvent system for the dispersant or interact negatively aromatic imide. In one embodiment, the non-acrylate monomers are less than 30, less than 20 and less than 10 mole percent of the total repeating units of the polyacrylate (i.e. the polyacrylate is at least 70, 80, or 90 mole percent repeat units from acrylate monomers). Typical mercaptoalcohols include 2-mercaptoethanol, 1-mercapto-2-propanol, 3-mercapto-1-propanol, 1-mercapto-2-propanol, 4-mercapto-1-butanol, 6-mercapto-1-hexanol, 4-mercaptophenol. Typical mercaptocarboxylic acids which may be employed include mercaptoacetic acid; mercaptopropionic acid; mercaptobutyric acid; mercaptovaleric acid; mercaptocaprioc acid; mercaptocaprylic acid: mercaptolauric acid. Preferably, the polymerisation can be performed in the presence of a non-functional radical initiator, for example, azo type initiators. Examples of suitable azo initiators include 2,2'-azobis(4-methoxy-2,4-dimethyl-valeronitrile), 2,2'-azobis(2,4-dimethyl-valeronitrile, 2,2'-azobisisobutyronitrile, dimethyl 2,2'-azobisisobutyrate, 2,2'-azobis(2-methyl-butyronitrile), 1,1'-azobis(1-cyclohexanecarbonitrile), 2-(carbamoylazo)-isobutyronitrile, 2,2'-azobis(2,4,4-trimethylpentane. The preferred initiators are 2,2'-azobisisobutyronitrile, and 1,1'-azobis(1-cyclohexanecarbonitrile).

Alternatively, the poly alkyl(meth)acrylate may be prepared by any polymerisation technique such as Ionic Polymerisation, Group Transfer Polymerisation (GTP), Atom Transfer Radical Polymerisation (ATRP), Nitroxide Mediated Radical Polymerisation (NMRP), single electron transfer radical polymerization (SET-LRP), telluride-mediated polymerization (TERP), or Radical Addition Fragmentation Polymerisation (RAFT) using a functional initiator or chain terminator that has one group reactive with isocyanates, for example, hydroxyl functional RAFT agents. RAFT agents are disclosed in numerous publications such as WO 2006/020281 and U.S. Pat. No. 7,279,591.

Functionality reactive with isocyanates may be introduced onto the polyacrylate solubilising chain before or after the polymerisation of the poly(meth)acrylate.

In one embodiment when a relatively non-polar media is used for the dispersant, the solvent solubilizing chains may be polyolefins such as derived from polymerizing and copolymerizing $C_2$-$C_{20}$ olefins including diolefins and various non-substituted and alkyl-substituted styrenes. These polymers are well known to the art. One preferred polymer is polyisobutylene. These polymers can be readily functionalized at one terminus with a hydroxyl group, an amino group or a succan group which can be further derivatised by reaction with diamines, polyamines or aminoalcohols to provide isocyanate reactive functionality.

In one embodiment where the solvent-solubilising chain is a polyester, the polyester chains can be formed from $C_3$-$C_{18}$ diacids reacted with $C_1$ to $C_{10}$ polyols. Such polyesters from diacids and polyols are well known to the art. Polyester chains derived from hydroxycarboxylic acids including lactone derivatives thereof are preferred, especially those derived from epsilon-caprolactone or mixtures of epsilon-caprolactone and delta-valerolactone. Such a polyester is also known as a poly(oxyalk(en)ylene carbonyl) chain where the alk(en)ylene has from 1 to 17 carbon atoms and can be linear or branched and can optionally include a carbon-to-carbon double bond (the (en) in the name). The oxylalk(en)ylene carbonyl can exist in the left to right or right to left version in the polymer (meaning that the carbonyl group can come first or the oxy group can be first in the repeat unit).

It is particularly preferred that the poly(oxyalkylene carbonyl) chain is derivable from two different hydroxycarboxylic acids or lactones thereof.

Preferably, the poly (oxyalkylenecarbonyl) chain (hereinafter POAC chain) for use with polar media contains $C_{1-7}$-alkylene groups. The hydrophilic/lipophilic nature of the chain can be varied between wide limits depending on whether the dispersant is to be used to disperse a particulate solid in a polar or non-polar medium. Thus, when the dispersant is to be used to disperse a particulate solid in a non-polar medium, preferably one or more of the hydroxy carboxylic acids containing a $C_{7-17}$-alk(en)ylene group are used. When a dispersant is desired to be used to disperse a particulate solid in a polar medium it is preferred that one or more and especially all of the hydroxy carboxylic acids or lactones thereof contains a $C_{1-6}$-alkylene group.

The hydroxy carboxylic acids may be linear or branched, saturated or unsaturated.

Examples of hydroxy carboxylic acids containing a $C_{7-17}$-alk(en)ylene group are ricinoleic, 12-hydroxystearic, 12-hydroxydodecanoic, 5-hydroxydodecanoic, 5-hydroxydecanoic and 4-hydroxydecanoic acids.

Examples of hydroxy carboxylic acids containing a $C_{1-6}$-alkylene group are glycolic, lactic, 5-hydroxyvaleric and 6-hydroxycaproic acid.

When the POAC chain contains one or more $C_{1-6}$-alkylene groups it is preferably obtained by polymerising one or more lactones. Examples of lactones are propiolactone, butyrolactone, valerolactone and caprolactone. It is particularly preferred that the lactone is delta-valerolactone or epsilon-caprolactone which are optionally substituted by $C_{1-8}$-alkyl more preferably $C_{1-6}$-alkyl and especially $C_{1-4}$-alkyl. Examples of such alkyl groups are methyl and tertiary butyl. Particularly useful effects have been obtained where the POAC chain is obtained by copolymerising delta-valerolactone and epsilon-caprolactone. Hereinafter delta will be δ and epsilon will be ε.

Copolymerisation of the hydroxy carboxylic acid or lactone thereof results in a POAC chain having a terminal hydroxy group and a terminal carboxylic acid group. (Hereinafter POAC compound). The POAC compound may be reacted at either the hydroxy and/or carboxylic acid group with a compound containing a functional group which undergoes an addition reaction with isocyanates such as hydroxy, thiol or amino groups. It is preferred, however, that the POAC compound undergoes an addition reaction with the polyisocyanate via the hydroxy group of the POAC compound.

The POAC chain may be prepared by first reacting a hydroxy carboxylic acid with the isocyanate group (s) of the polyisocyanate followed by co-polymerisation with additional hydroxy carboxylic acid or lactone thereof to build the POAC chain. However, it is preferable to first prepare the POAC compound and to react this with the isocyanate group (s) of the polyisocyanate. In this case it is preferable to carry out the co-polymerisation of the hydroxy carboxylic acid or lactone thereof in the presence of a polymerisation chain terminator. The chain terminator may contain a thiol, primary or secondary amino group, but preferably contains a hydroxy group which reacts with the carboxylic acid group of the POAC compound to form a thioester, amide or ester group respectively. The POAC compound derived from two different hydroxycarboxylic acids or lactones thereof and which contains a chain terminator attached to the POAC chain via the carbonyl group is a compound of formula below.

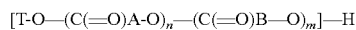

$$[T-O-(C(=O)A-O)_n-(C(=O)B-O)_m]-H$$

wherein
T is a chain terminating group;
A and B are different $C_{1-17}$-alk(en)ylene;
n and m are integers; and
n+m is from 2 to 200.

The POAC compound of the formula shown above is hereinafter referred to as a TPOAC alcohol.

The POAC chain or TPOAC alcohol is readily prepared by heating together the hydroxycarboxylic acids or lactones thereof, preferably in the presence of a polymerisation terminator in an inert atmosphere and preferably in the presence of an esterification catalyst. The reaction may be carried out in the presence of an inert solvent which does not react with the starting materials or the POAC compound or TPOAC alcohol. Preferably, the reaction is carried out in the absence of a solvent. Typically the temperature of the reaction is between 120 and 180° C.

Examples of esterification catalysts are tetra-alkyltitanate such as tetrabutyltitanate, zinc salts of an organic acid such as zinc acetate, tin salts of an organic acid such as tin octanoate, zirconium salts of an aliphatic alcohol such as zirconium isopropoxide, toluenesulphonic acid, phosphoric acid or a strong organic acid such as trihaloacetic acid, e. g. trifluoroacetic acid.

As noted hereinbefore, the chain terminator preferably contains a hydroxy group when the different hydroxycarboxylic acids or lactones thereof are copolymerised in the presence of T-OH.

T is optionally substituted $C_{1-35}$-hydrocarbyl and may be aromatic, alicyclic, heterocyclic or aliphatic which may be linear or branched, saturated or unsaturated.

Preferably, T contains not greater than 20 carbon atoms and more preferably not greater than 12 carbon atoms.

Optional substituents include halogen, $C_{1-6}$-alkoxy, ester (i. amide, urethane and ether groups. When T-OH contains one or more ether groups it is preferably derivable from propylene and/or ethylene oxide. Thus, T-OH may be a monohydric alcohol or phenol which is (co) polymerised with propylene and/or ethylene oxide. Examples of monohydric alcohols are $C_{1-20}$-aliphatic alcohols which may be linear or branched, saturated or unsaturated such as phenoxyethanol, octanol, $C_{1-18}$-fatty alcohols, nonanol, ethanol, butanol and methanol. Examples of phenols (co) polymerised with propylene and/or ethylene oxide are nonylphenol and naphthol.

When T contains ester, amide or urethane groups, such groups may be made by linking chain fragments of T which contain amino or hydroxy groups using dibasic acids or anhydrides or di-isocyanates with diols, diamines and aminoalcohols. Examples of compounds capable of such cross-linking chain fragments of T are terephthalic acid, adipic acid, maleic acid, phthalic anhydride, maleic anhydride and toluene di-isocyanate. Examples of diols, diamines and aminoalcohols include ethylene glycol, propylene glycol, ethylenediamine and ethanolamine.

In a preferred class of dispersants, T is $C_{1-35}$-alkyl, more preferably $C_{1-20}$-alkyl and especially $C_{1-12}$-alkyl and the appropriate O or N atom to connect to the POAC chain.

Whereas, the solvent-solubilising polyether, polyolefin, polyester, or polyacrylate (preferably terminal in this embodiment) chains may contain a second terminal group less reactive with isocyanates than the coupling terminal group, it is much preferred that such terminal solubilising chains carry one terminating group which is not reactive with isocyanates and especially a $C_{1-35}$-hydrocarbyl group since this restricts any cross-linking during the preparation of the dispersant. The hydrocarbyl group may be optionally branched alkyl, cycloalkyl, aryl or aralkyl.

The cycloalkyl group is preferably $C_{3-6}$-cycloalkyl such as cyclopropyl and especially cyclohexyl. The aryl group is preferably $C_{6-10}$-aryl such as naphthyl and especially phenyl which may be substituted by halogen, $C_{1-20}$-alkyl or $C_{1-20}$-alkoxy. The aralkyl group is preferably 2-phenylethyl and especially benzyl where the phenyl ring is optionally substituted by halogen, $C_{1-20}$-alkyl or $C_{1-20}$-alkoxy.

The length of the alkyl terminating group of the polyester, polyether, and/or polyacrylate chain depends to a large extent on the nature of the organic medium. Thus, for example, when the organic medium is a polar organic liquid, the hydrocarbyl group is preferably $C_{1-12}$ alkyl which may be linear or branched. The hydrocarbyl group includes ethyl, propyl, isopropyl or mixtures thereof. When the polyurethane dispersant contains polyether terminal chains, it is preferred that the terminating alkyl group is $C_{1-4}$ alkyl, for instance methyl, because of their ready commercial availability. When the organic medium is a non-polar organic liquid, it is preferred that the terminating alkyl group contains greater than 8 carbon atoms. It is also preferred that the alkyl group is branched since this aids solubility in the non-polar organic liquid.

By way of an obvious variant, the solvent-solubilising polyester, polyolefin, polyether, and/or polyacrylate terminal chains may themselves be mixtures of such chains. Thus, for example, the polyester side chains may contain a polyether moiety and vice-versa.

The total weight percentage of the solvent-soluble (solubilising) terminal chains of component (e.g., polyether, polyolefin, polyester, and/or polyacrylate) in the polyurethane dispersant in one embodiment is preferably not less than 5%, in another embodiment not less than 20%, more preferably not less than 30% and especially not less than 40% by weight of the polyurethane dispersant. It is also preferred that the total weight percentage of solvent-soluble terminal chains in the polyurethane dispersant is not greater than 80%, more preferably not greater than 70%, especially not greater than 60% based on the weight of the dispersant. In one embodiment, the total weight percentage of solvent-soluble terminal chains in the polyurethane dispersant is not greater than 60%, for instance 40% to 60%. The weight percentages above are based on the final weight of the urethane dispersant including the aromatic imide groups and optional crosslinking and modifier groups.

The polyurethane polymers according to the invention may be prepared by any method known to the art. Typically, the polyurethane dispersant is obtainable or obtained by reacting one or more polyisocyanates component (a) with one or more solvent-solubilizing chains, one or more compounds comprising an aromatic imide group and a group reactive with isocyanates, one or more optional crosslinking components, and one or more optional modifying components. In one embodiment, the generally mono-reactive solvent-solubilizing polyether, polyolefin, polyester or polyacrylic chain is introduced at the start of the polyurethane synthesis only with a polyisocyanate and a compound reactive with isocyanate groups that has an aromatic imide group within it.

The number average molecular weight of the polyurethane dispersant is preferably not less than 2,000, more preferably not less than 2,500 and especially not less than 3,000. It is also preferred that the number average molecular weight of the polyurethane polymer is not greater than 30,000, more preferably not greater than 20,000 and especially not greater than 15,000 g/mole.

W may be any group capable of reaction with an isocyanate group for example amino, hydroxyl, carboxyl, w is 1 or more, more desirably from 2, 3, or 4 to 100, more desirably 2, 3, or 4 to 25 and preferably 2, 3, or 4 to 20.

According to the present invention there is provided a composition comprising a particulate solid, an organic or aqueous medium and a polyurethane dispersant having pendant solubilizing chains of polyester, polyether, polyolefin or polyacrylate and with imides.

The imide is represented in formula 1b.

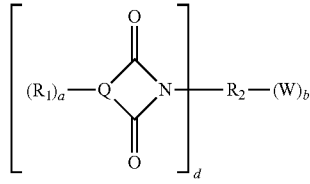

Where $R_1$, Q, a, b, d, W and $R_2$, are as earlier defined.

W' is a residue of the reaction of an amino, hydroxyl or carboxyl group, preferably amino or hydroxyl of the imide containing group with an isocyanate in a conventional reaction between an amino, hydroxy, or carboxyl group with an isocyanate.

Pol is a polyurethane comprising a reaction product of at least one polyisocyanate having an average functionality of from 3 to 10 and one or more polyolefin, polyether, polyacrylate or polyester solvent-solubilising chains.

The polyisocyanates used to make the dispersants in this embodiment desirably are initially or reacted to generate isocyanate functionality of three or more. These include those obtainable by the addition reaction of di-isocyanates and polyols such as

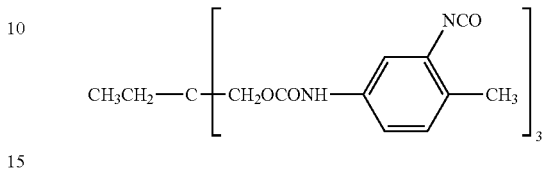

or those obtainable from di-isocyanates by the biuret reaction, such as

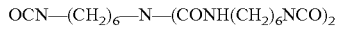

or polyisocyanates obtainable by the cyclisation of di-isocyanates such as

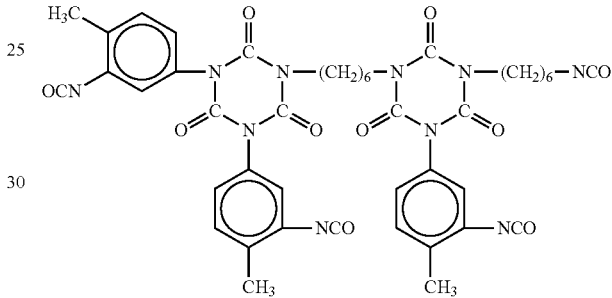

Trade product: Desmodur® HL

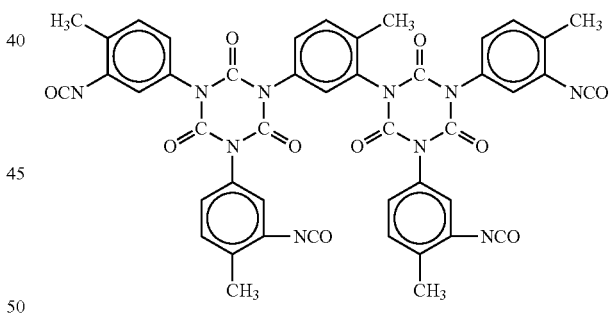

Trade product: Desmodur® IL

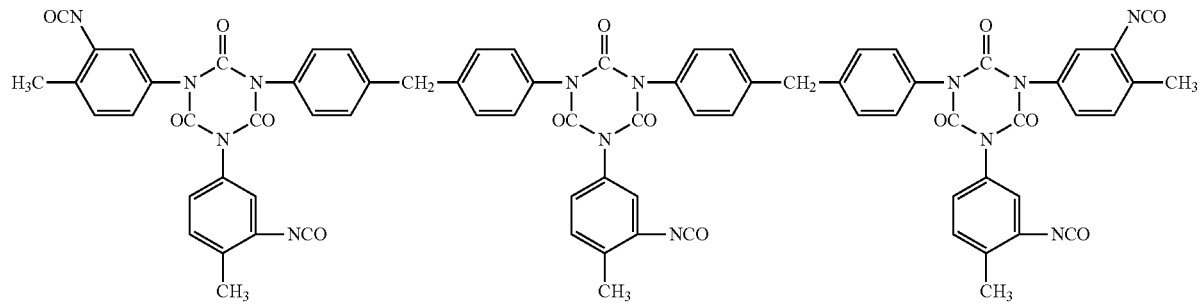

Trade product: Polurene® KC

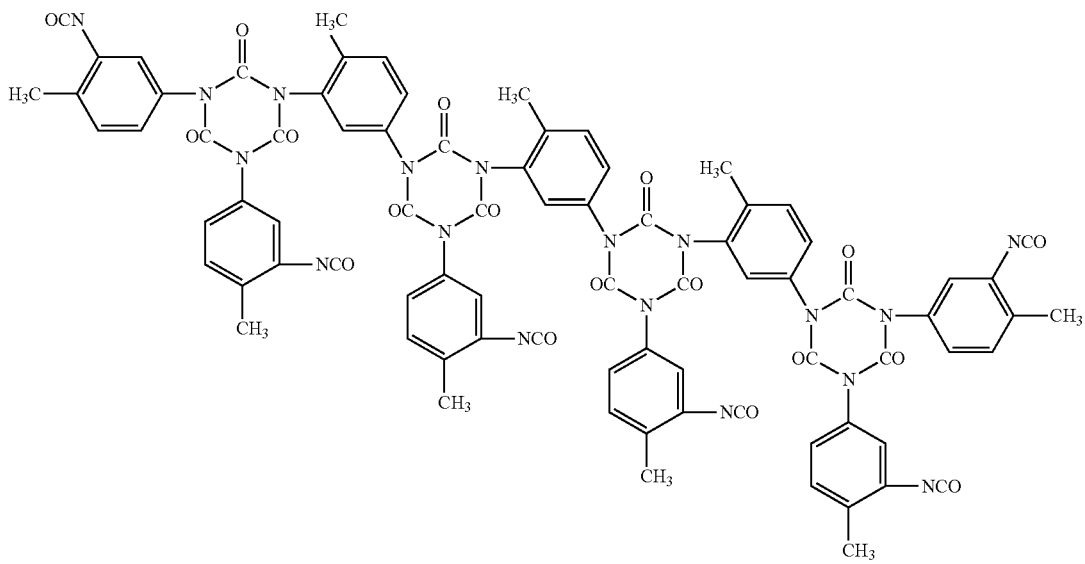

Trade product: Polurene® HR

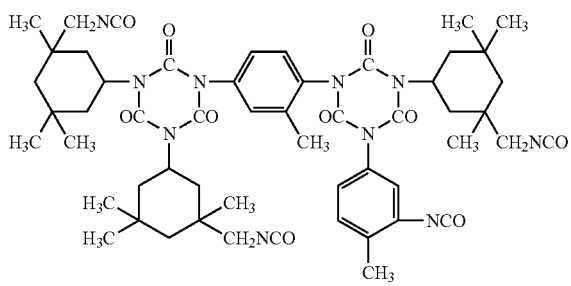

Tolylene diisocyanate-isophorone diisocyanate-isocyanurate Company: SAPICI)

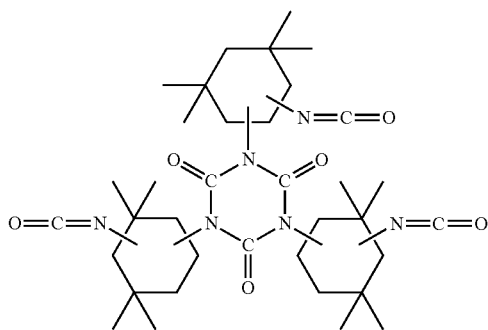

Trimeric isophoronediisocyanate (isocyanurate-T1890 of Chemische Werke Huls)

Further examples of polyisocyanates available as commercial products include Desmodur VL (polyisocyanate based on diphenylmethane diisocyanate (MDI) from Bayer), Desmodur A 4370 (polyisocyanate based on isophorone diisocyanate (IPDI) from Bayer), Polurene KD (polyisocyanate based on toluene diisocyanate (TDI) from SAPICI), Uronal RA. 50 (polyisocyanate based on TDI from Galstaff), Polurene A (polyisocyanate based on TDI-trimethylol propane (TMP) from SAPICI), Polurene MC (polyisocyanate based on TMP-IPDI from SAPICI), Polurene MD. 70 (polyisocyanate based on TMP-TDI-, MDI from SAPICI.

Many of the polyisocyanates are commercially available as mixtures. The term "average functionality" means the statistical average number of free isocyanate groups in the polyisocyanate and is the ratio of average molecular weight of the polyisocyanate and the isocyanate equivalent weight taking into account the number of isocyanate groups.

The polyisocyanate may be aliphatic or alicyclic but is preferably aromatic.

Examples are hexamethylene di-isocyanate, isophoronedi-isocyanate, 4,4'-diphenylmethanedi-isocyanate, 2,4-tolylenedi-isocyanate and 2,6-tolylenedi-isocyanate, including mixtures thereof.

Compounds useful to react with polyisocyanates to create higher functionality polyisocyanates preferably contain at least two hydroxy and/or primary or secondary amino groups. Examples are trimethylolpropane, diethanolamine, triethanolamine but especially compounds containing two groups which react with isocyanate, for example, aliphatic diols such as ethyleneglycol, propyleneglycol, butane-1,3-diol, butane-1,4-diol, 1,5-pentanediol, 1,6-hexanediol and 1,10-decanediol. Other compounds useful to react with polyisocyanates to create higher functionality polyisocyanates contain at least two hydroxy groups and optionally other non-interfering groups, such as a carboxylic acid, phosphoric acid, phosphonic or sulphonic acid group(s). Examples of compounds with at least two hydroxy groups and a carboxylic acid group are 2,2-bis(hydroxymethyl) propionic acid and 2,2-Bis(hydroxymethyl)butyric acid. An example of a compound with two hydroxy groups and a sulphonic group is 1,3-benzene dicarboxylic acid-5-sulpho-1,3-bis (2-hydroxyethyl) ester (EGSSIPA). An Example of a compound with at least two hydroxy groups and a phosphonic group is poly(oxy-1,2-ethanediyl), α,α'-(1,4-dioxo-2-phosphono-1,4-butanediyl)bis[ω-hydroxy-(9CI).

Other preferred compounds to create higher functionality polyisocyanates are aliphatic diamines such as ethylenediamine, 1,3-propylenediamine, hexamethylenediamine, 1,12- diaminododecane and compounds of formula V—NH(CH$_2$)$_3$NH$_2$ where V is a long aliphatic chain such as tallow. Other preferred examples of compounds to create higher functionality polyisocyanates are amino alcohols such as ethanolamine, p-hexadecylaminoethanoi, diols containing ether groups such as diethyleneglycol, triethyleneglycol, polyethyleneglycol, dipropyleneglycol and ethoxylated aliphatic amines.

As noted hereinbefore, the dispersants are similar to those disclosed in U.S. Pat. Nos. 4,647,647, 4,795,796, 5,399,294, 5,425,900 and WO 97/26984 but exhibit superior properties. The contents of these disclosures are incorporated herein by reference.

In one embodiment, each Pol having an isocyanate functionality above 2 should on average preferably contain one or more solvent solubilising chains provided that there remain one or more unreacted isocyanate groups (from said polyisocyanate) which are not reacted with the solvent solubilising chain. Of these "free" remaining isocyanate groups, optionally some of the free isocyanate group can be reacted with a cross-linker to link two polyisocyanate molecules carrying one or more solvent solubilising chains and the remaining free isocyanate can be reacted with an imide compound of formula 2-7 where R$_1$ and R$_2$ are as previously defined and R$_3$ is H or a lower alkyl group of 1 to 6 carbon atoms, H is preferred.

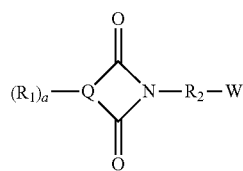

Formula 2

An example of Formula 2 wherein W is a hydroxyl group (—OH) can be prepared by the reaction of an anhydride with an amino alcohol. The aminoalcohol may be ethanolamine, 3-amino-1-propanol, 4-aminobutanol, 2-aminobutanol, 2-amino-2-methyl-1-propanol, 5-amino-1-pentanol, 5-amino-2-pentanol, 2-amino-3-methyl-1-butanol, 6-amino-1-hexanol, 2-amino-1-hexanol, serinol, 4-amino cyclohexanol, 2-(2-aminoethoxy)ethanol. Mixtures of aminoalcohols may be used.

An example of Formula 2 wherein W is an amino group (—NHR$_3$) can be prepared by the reaction of an anhydride with a diamine as described in Dalton Transactions, 2003, 4537-4545. Examples of diamines include 1-methyl-1,3-propanediamine, n-methylene ethylene diamine, 1,2-diaminoethane, propane-1,3-diamine, butane-1,4-diamine, pentane-1,5-diamine, hexane-1,6-diamine, dodecane-1,12-diamine. Mixtures of diamines may be used.

An example of Formula 2 wherein W is a carboxylic acid group (—CO$_2$H) can be prepared by the reaction of an anhydride with an aminocarboxylic acid. The aminocarboxylic acid may be 11-amino undecanoic acid, 12-amino dodecanoic acid, 6-amino caproic acid, 4-aminobutyric acid, aspartic acid, glutamic acid, lysine, asparagine, glutamine, threonine, serine, cysteine, β-alanine, glycine, and sarcosine. Mixtures of amino carboxylic acids may be used.

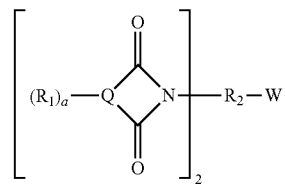

Formula 3

An example of Formula 3 is synthesised by reacting two molar equivalents of anhydride with one molar equivalent of 1,3-diamino-2-propanol where W is —OH or with one molar equivalent of diethylene triamine where W is —NH—.

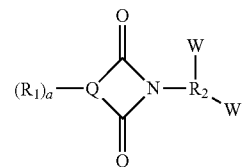

Formula 4

In Formula 4, W may be the same group or two different groups. An example of Formula 4 is synthesised when one molar equivalent of anhydride is reacted with one molar equivalent of 3-amino-1,2-propane diol or 2-amino-2-methyl-1,3-propanediol wherein W is —OH at both instances for each imide, or with one molar equivalent of diethylene triamine where one W is a —NH— and the other is a —NH$_2$. Another example is when one molar equivalent of anhydride is reacted with one molar equivalent of 2(3-aminopropylamino)ethanol where one W is a —NH— and the other is —OH as shown in Formula 5.

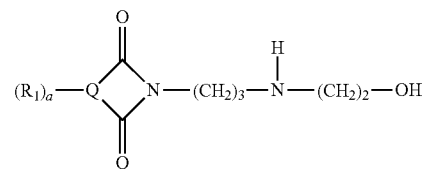

Formula 5

Another example of Formula 4 where one W is —NH— and another W is —OH can be synthesized by reaction of an anhydride with a diamine to form an imide of Formula 2 where W is —NH$_2$, then the free amino group can subsequently be reacted with 2-hydroxyethyl acrylate to give an imide of Formula 6.

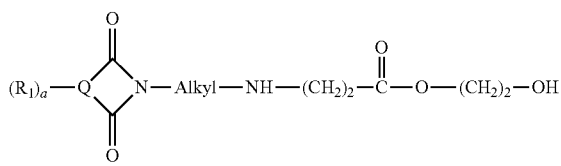

Formula 6

Another example is when 2 molar equivalents of anhydride can be reacted with one molar equivalent of triethylene tetramine and in this instance both Ws are —NH— as shown in Formula 7.

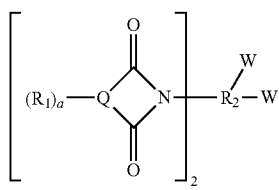

Formula 7

Imide Synthesis

The imide is prepared in the melt or in solvent, at temperatures between 100-200° C. The synthesis may involve a volatile solvent (bpt <100° C.) to improve mixing of reagents, which is then distilled as the temperature is raised above the boiling point of this solvent.

Preferably the imide is prepared in the polymerisation solvent to avoid isolation of this intermediate. The maximum reaction temperature depends on the boiling point of this solvent, examples of suitable solvents are toluene (bpt=110-111° C.), xylene (bpt=137-140° C.), propylene glycol monomethyl ether acetate (bpt=145-146° C.), dipropylene glycyol methyl ether acetate (bpt=200° C.), diethylene glycol dibutyl ether (bpt=256° C.), tetraethylene glycol dimethyl ether (bpt=275-276° C.) or mixtures thereof. The imide may also be prepared using the solvent-solubilizing chain as a diluent providing that the group located at the chain end of the solvent-solubilizing chain does not react with the anhydride.

Preferably the imide is formed before reaction with the polyisocyanate, if a mixture of amide and imide is present, the amide may convert to imide during the polymerisation process or after the polymerisation process by prolonged heating. A catalyst may be necessary to achieve high conversion of imide and some amide may still be present in the final product.

An example of Formula 4 is the reaction of anhydride with an aminocarboxylic acid. Examples of aminocarboxylic acid include 11-amino undecanoic acid, 12-amino dodecanoic acid, 6-amino caproic acid, 4-aminobutyric acid, β-alanine, glycine, and sarcosine or mixtures thereof.

According to the invention at least one isocyanate is reacted with a solvent solubilising chain and the remainder is reacted with imide such as in formula 2-4, and optionally a crosslinker if a higher molecular weight dispersant is desired. Preferred imides are derived from fused aromatic rings such as naphthenic rings, optionally substituted. Examples of anhydrides to derive the imide are 1,2-naphthalic anhydride, 1,8-naphthalic anhydride, 2,3-naphthalic anhydride, 4-nitro-1,8-naphthalic anhydride, 3-nitro-1,8-naphthalic anhydride, 4-chloro-1,8-naphthalic anhydride group, 4-sulpho-1,8-naphthalic anhydride or 3-sulpho-1,8-naphthalic anhydride.

When the polyisocyanate has an average functionality of 4 or more, at least 25%-75% of the isocyanate groups are reacted with a solvent-solubilising chain and the remainder 75-25% are reacted with imide such as shown formula 2-4. Optionally a cross linker may be present such that 25-75% of the isocyanate groups are reacted with a solvent-solubilising chain, 1-25% of the isocyanate groups are reacted with a crosslinker and the remaining 27-75% are reacted with an imide of formula 3-5.

When the isocyanate has an average functionality of 3, at 10%-90% of the isocyanate groups are reacted with a solvent-solubilising chain and the remainder 20-80% are reacted with imide such as shown in formula 2-4. Optionally a cross linker may be present such that desirably 20-80% and more desirably 30-70%, of the isocyanate groups are reacted with a solvent-solubilising chain, 0 or 1-30% of the isocyanate groups are reacted with a crosslinker and the desirably the remaining 30-70% more desirably 40-60% are reacted with an imide of formula 2-4.

According to the present invention there is provided a composition comprising a particulate solid, an organic or aqueous medium and a polyurethane dispersant having pendant solubilizing chains of polyester, polyether, polyolefin, polyacrylate or mixtures thereof and pendant side chains with imides.

Each imide is represented in formula 1b

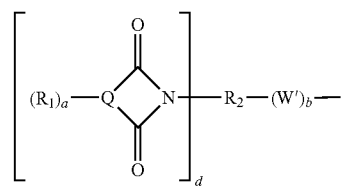

$R_1$ may be a substituent on Q ring in any position available for bonding to a substituent group and $R_1$ may be independently represented by one or more of —H, or an electron withdrawing group (such as —$NO_2$, —$SO_2NR'_2$, —C(O)R', —$SO_3M$, halo e.g., —Cl or —Br, —$NH_2$, or —OR'), or an electron releasing group (such as an alkyl group e.g., —$CH_3$), (typically when $R_1$ may be other than —H, the number of non-H groups defined by a may be 0 to 2, 0 to 1, 0, or 1). For example, $R_1$ may be —H, $CH_3$, —Cl, or —Br, —$NO_2$, —$SO_3M$, or —CN (typically when a may be non-zero $R_1$ may be —Cl, —Br, —$SO_3M$ or —$NO_2$); M may be H, a metal cation, $NR'_4{}^+$, or mixtures thereof; R' may be —H, an optionally-substituted alkyl typically containing 1 to 20, or 1 to 10 carbon atoms, and the substituent may be hydroxyl or halo (typically Cl or Br) or mixtures thereof;

Q may be a fused or non-fused aromatic ring containing 4n+2 π-electrons, wherein n=1 or more, (typically 1 to 3, or 1 to 2, or 1), and Q may be bonded to the imide group in such a way to form a 5 or 6 membered imide ring (typically 5 membered).

b is 1 or 2 and when b is 1 the imide group is terminal and attached to the Pol by one chemical bond and when b is 2 the imide group is a side chain attached to Pol by two chemical bonds.

d is 1, 2, or 3; more preferably 1 or 2, and most preferably 1; this means that there is the possibility of 1 to 3 imide groups attached to $R_2$ at different carbon atoms of $R_2$ $R_2$ may be a $C_1$ to $C_{20}$, or $C_1$ to $C_{12}$, or $C_1$ to $C_6$ hydrocarbylene group or a $C_1$ to $C_{20}$, or $C_1$ to $C_{12}$, or $C_1$ to $C_6$ hydrocarbonylene group (when $R_2$ contains more than 2 carbon atoms, the hydrocarbylene group or hydrocarbonylene group may be linear or branched) or mixtures thereof; optionally said hydrocarbylene group can contain up to one oxygen or nitrogen linkage per every 2 carbon atoms in $R_2$.

Pol is a polyurethane comprising a reaction product of at least one polyisocyanate with at least one member or the group of solvent-solubilizing chains comprising polyether, polyester, polyolefin or polyacrylate solubilizing chains or mixtures thereof;

W may be any group capable of reaction with an isocyanate group for example amino, hydroxyl, carboxyl, w is 1 or more, more desirably from 2, 3 or 4 to 30, more desirably 1, 2, 3, 4 to 25 and preferably 1, 2, 3, 4 to 10 or 20;

Polyisocyanates having an average functionality of from 3 to 6 are preferred. As an alternative to commercially available polyisocyanates with 3 to 6 isocyanate groups one can use a polyisocyanate with two or more reactive isocyanate groups reacted with a polyol of hydroxyl functionality exceeding two or a polyamine with aminic functionality exceeding two.

The amount of solvent-solubilising chain which undergoes the addition reaction with the polyisocyanate may vary over wide limits depending on the end use of the dispersant and particularly whether the dispersant is to be used to disperse a particulate solid in a polar medium or in a non-polar medium.

In another embodiment, each polyisocyanate molecule should on average preferably contain one or more solvent-solubilising chains provided that there remain one or more isocyanate groups which are not reacted with the solvent-solubilising chains.

Of these "free" remaining isocyanate groups, one free isocyanate group is optionally reacted with a cross-linker to link two polyisocyanate molecules carrying one or more solvent-solubilising chains and the remaining isocyanate is optionally reacted with a "modifier"; especially to an imide according to this disclosure wherein the carbonyl groups of the imide are attached to a fused or non-fused aromatic ring. Additional, optional modifiers may be used to adapt the dispersant for use in a polar or non-polar medium. Thus, where the polyisocyanate has an average functionality of about 3, preferably at least 0.8, and more preferably about 1 of the isocyanate groups is reacted with a solvent-solubilising chain. When the polyisocyanate has an average functionality of between 3 and 6, it may be reacted with more than one solvent-solubilising chain for each molecule of the polyisocyanate. The remaining "free" isocyanate groups may be reacted with optional cross-linkers or modifiers although it is preferred that at least one of the remaining free isocyanate groups is reacted with a imide modifier of formula 1b.

The reaction of the polyisocyanate with the solvent-solubilising chains, optional cross-linker and at least one imide modifier of formula 1b may be carried out simultaneously but is preferably carried out sequentially. The reaction between the polyisocyanate and solvent-solubilising chains thus results in the reaction of from 15% to 50% of the available isocyanate groups. Preferably not greater than 40%, more preferably not greater than 35% and especially not greater than 30% of the available isocyanate groups are reacted.

When the polyisocyanate containing one or more solvent-solubilising chains is optionally reacted with a cross-linker, up to 45% of the initial isocyanate groups can be reacted with the optional cross-linker, more preferably not greater than 40%, even more preferably not greater than 35% and especially not greater than 30% of the initial isocyanate groups can be reacted with the optional cross-linker. Preferably, the amount of solvent solubilising chains is greater than the amount of optional cross-linker.

When the reactions of the polyisocyanate with the solvent-solubilising chains and optional cross-linker are taken together, not less than 40% and especially not less than 45% of the initial isocyanate groups are reacted. The number of isocyanate groups which react with the solvent-solubilising chains and the optional cross-linker is not greater than 75%, preferably not greater than 65%, more preferably not greater than 55% and especially not greater than 50% of the initial isocyanate groups. Finally, the remaining free isocyanate groups are reacted with at least one imide modifier of Formula 1b.

The optional cross-linker is preferably a compound of general formula 8, D-(E)$_p$ wherein E is OH, NH$_2$, NHR$_4$, —CO$_2$H; p is 2 or 3; D is an aliphatic, cycloaliphatic and/or aromatic group having a molecular weight of not greater than 4000 g/mole and which contains two or more carbon atoms and may contain ether, thioether, ester (i. e. OCO), amide, urethane, sulphone, or —Si(CH$_3$)$_2$—O-groups and R$_4$ is C$_{1-8}$-alkyl, especially C$_{1-4}$-alkyl. Preferably E is hydroxyl and/or carboxylic acid and it is particularly preferred that D-(E)$_p$ is a diol, a hydroxycarboxylic acid, or a diacid.

Examples of cross-linkers of formula 8 are diols, triols, diamines, dialkanolamines, C$_{2-12}$-monoalkanolamines, dihydroxydialkyl sulphides and dihydroxy sulphones such as butanediol, hexanediol, cyclohexanedimethanol, neopentylglycol, ethyleneglycol, alkyl substituted dialkanolamines, glycerol, trimethylolpropane, fatty acid dialkanolamides, thiodiglycol, di-(4-hydroxyphenyl)-sulphone, hydroxycarboxylic acids such as 12-hydroxystearic acid, lactic acid, ricinoleic acid, 4-hydroxybenzoic acid, aminocarboxylic acids such as 4-aminobutyric acid, 6-aminocaproic acid, 11-aminoundecanoic acid, and diacids such as malonic, succinic, adipic and sebacic acids.

The cross-linker may also contain a solvent solubilising chain having two or more groups that are reactive with isocyanates. Preferred cross-linkers containing solvent solubilising chains are polyols such as polyalkyleneglycols, preferably containing a C$_{2-4}$-alkylene moiety, and more preferably an ethylene moiety, polyester polyols and poly ether/ester polyols obtainable from the polymerisation of a lactone as already mentioned above using diols and triols as already listed. Polyester polyols available as commercial sources include CAPA® polyols from Perstorp such as CAPA 2047A, 2043, 2054, 2085, 2100 and 2121. Preferred polyols are those having a molecular weight from 400 to 4000 g/mole and more preferably from 500 to 2000 Dalton and especially 600-1500 g/mole. Butanediol and ethyleneglycol are preferred starting materials for the polyols. Polyols with 3 hydroxy groups are obtainable from triols as starting materials such as trimethylolpropane. Polyethyleneglycols are the preferred polyalkyleneglycols.

Other examples of cross-linkers of formula 2 are monohydroxy-monocarboxylic acids obtainable by the esterification of hydroxycarboxylic acids or by the reaction of a diol with a dicarboxylic acid or its anhydride. The diol is preferably a poly (C$_{2-4}$-alkyleneglycol) and especially a polyethyleneglycol. It is also preferred that the molecular weight of the diol is greater than the molecular weight of the dicarboxylic acid or anhydride. The monoamino monocarboxylic acids are obtainable in an analogous manner.

Other examples of cross-linkers of formula 2 are dicarboxylic acids obtainable by reacting a diol with a dicarboxylic acid or anhydride thereof. The diol is preferably a poly (C$_{2-4}$-alkyleneglycol) and especially a polyethyleneglycol. It is also preferred that the molecular weight of the diol is greater than the molecular weight of the dicarboxylic acid or anhydride. Preferably, the dicarboxylic acid cross-linkers contain at least eight carbon atoms between the carboxylic acid groups which may be substituted by amide, ether, ester (i. e. OCO), thioether, sulphone and/or urethane groups. Examples of the dicarboxylic compounds are the reaction products of polyethyleneglycol (MW 1000) with maleic and/or phthalic anhydride.

Finally, any "free" remaining isocyanate group is reacted with an imide r resulting in a bound imide of formula 1b. In one embodiment at least one imide of the formula below is attached to each Pol. In a more preferred embodiment at least 2, 3, or 4 imides of formula 1b are attached to each Pol.

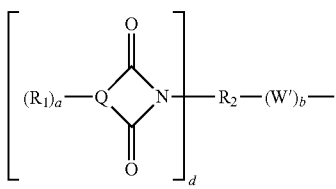

Wherein $R_1$, $R_2$, a, b, Q, d, and W' are as previously defined.

Optionally, additional modifiers can also be reacted with any remaining free isocyanate groups. In general, any compound can be used as the additional optional modifier provided it contains a group capable of reacting with an isocyanate group. The nature of any additional modifiers depends on the end-use of the dispersant.

In another embodiment, any additional, optional modifiers contain a group capable of reacting with an isocyanate group such as —OH, $NH_2$, $NHR_5$ or SH wherein $R_5$ is $C_{1-8}$-alkyl and especially $C_{1-4}$-alkyl and have
  i) at least one tertiary amino group or a heterocyclic group containing at least one basic ring nitrogen atom which carries no hydrogen atom and where the amino or heterocyclic group may be attached to the reactive group —OH, $NH_2$, NHR' or SH by an alkylene group containing up to 10 carbon atoms; or
  ii) at least one acidic functional group which may be attached to the reactive group —OH, $NH_2$, NHR' or SH by a hydrocarbylene group containing up to 18 carbon atoms and may contain tertiary amine atoms; or
  iii) at least one OH group, which may be present as an acetal; or
  iv) at least one —$Si(OR^3)_t(R^4)_{3-t}$ group wherein $R^3$ and $R^4$ are $C_{1-10}$-alkyl and t is from 1 to 3; or
  v) a heterocyclic group containing at least one basic ring nitrogen atom which carries no hydrogen atom and is obtainable by reacting an acrylate or epoxide with a heterocyclic ring system; or
  vi) combinations of i)-v) thereof.

Preferably, the additional, optional modifiers containing a heterocyclic group having a ring nitrogen atom is attached to the reactive group —OH, —$NH_2$, NHR' or —SH, preferably by $C_{1-5}$-alkylene. Preferred heterocyclic groups are optionally substituted triazole, pyrimidine, imidazole, pyridine, morpholine, pyrrolidine, piperazine, benzimidazole, benzthiazole and/or triazine. Substituents may be $C_{1-6}$ and especially $C_{1-4}$-alkyl or alkoxy or amino.

As noted hereinbefore optional modifiers containing at least one tertiary amino group or a heterocyclic group may be attached to the reactive group —OH, $NH_2$, —NHR' or —SH via an alkylene group containing up to 10 carbon atoms, preferably $C_{2-8}$-alkylene and especially $C_{2-4}$-alkylene. They may also be attached via a polyether group containing the same number of carbon atoms as the alkylene group.

Specific examples of optional modifiers containing at least one tertiary amino group or a heterocyclic group are N, N-diethyl-1,4-butanediamine, 1-(2-aminoethyl)-piperazine, 2-(1-pyrrolidyl)-ethylamine, 4-amino-2-methoxypyrimidine, 2-dimethylaminoethanol, 1-(2-hydroxyethyl)-piperazine, 4-(2-hydroxyethyl)-morpholine, 2-mercaptopyridine, 2-mercaptobenzimidazole. It is particularly preferred that optional modifiers containing at least one tertiary amino group or a heterocyclic group are N, N-dimethyl-1,3-propanediamine, 4-(2-aminoethyl)-pyridine, 2-amino-6-methoxybenzothiazole, 4-(aminomethyl)-pyridine, N, N-diallylmelamine, 3-amino-1,2,4 triazole, 1-(3-aminopropyl)-imidazole, 4-(2-hydroxyethyl)-pyridine, 1-(2-hydroxyethyl)-imidazole, or 3-mercapto-1,2,4-triazole. It is a characteristic of these compounds that they contain at least one Zerewitinoff-active hydrogen atom per molecule, which hydrogen atom preferably reacts with the isocyanate groups and that they additionally contain a basic group which contains nitrogen and which is not capable of reacting with isocyanate groups to form a urea. Such basic groups are also characterised by their pKa-values as, for example, in U.S. Pat. Nos. 3,817,944, 4,032,698 and 4,070,388.

Preferably, the additional optional modifier containing a group capable of reacting with an isocyanate group —OH, $NH_2$, NHR' or SH is attached to at least one acidic group by a hydrocarbylene group containing up to 17 carbon atoms and may contain tertiary amine atoms.

Specific examples of optional modifier containing at least one acidic group are mercaptoacetic, mercaptopropionic, mercaptosuccinic, mercaptobenzoic, ricinoleic, 12-hydroxystearic, hydroxyacetic, hydroxysuccinic, hydroxybutyric, aminobutyric, 4-aminophenylacetic, 4-aminobenzoic, aminoacetic, hydroxyethanesulphonic, hydroxypropanesulphonic, mercaptoethanesulphonic, aminomethanesulphonic, 3-aminopropanesulphonic, sulphanilic, N— (2-hydroxyethyl) ethylenediaminetriacetic(2-hydroxyethyl) ethylenediaminetriacetic acid, N— (2-hydroxyethyl) imino diacetic, 4-aminobenzenephosphonic and 3-aminopropane-1-phosphonic acids.

Specific examples of optional modifiers containing one or more OH groups are organic polyols such as ethyleneglycol, propyleneglycol, 1,12-dodecanediol, 1,4-bis (hydroxymethyl) cyclohexane, phenylethyleneglycol, diethyleneglycol, butanediol, triethyleneglycol, dipropyleneglycol, 2-butane-1,4-diol, 3-hexene-2,5-diol, glycerin, 1,2,4-butanetriol, triethanolamine, 2,2-bis (hydroxymethyl)-1,3-propanediol, 1,2,7,8-octanetetrol, dipentaerythritol, N,N, N'N'-tetrakis (2-hydroxypropyl) ethylenediamine.

Preferred specific examples of monohydroxy or polyhydroxy compounds which contains an amino group are ethanolamine, 3-aminopropanol, isopropanolamine, 2-methylaminoethanol, 2,2'-aminoethoxyethanol, 1-aminopropane-2,3-diol, 2-amino-2-ethylpropane-1, 3-diol, 2-butylaminoethanol, tris (hydroxymethyl) aminoethane, 2-cyclohexylaminoethanol, 3-amino-2,2-dimethyl-1-propanol, 4-amino-1-butanol and 2-amino-1-phenylpropane-1, 3-diol.

If as described above, optional modifiers with several isocyanate reactive groups, such as hydroxy acids, amino acids, diols, or amino alcohols are used, then these types of modifier can lead to cross-linking reactions if they are used in ratios smaller than the available free isocyanate groups. The direction of the reaction will also depend on the varying reactivities of the individual NCO reactive groups as well as on the reaction conditions. If an optional modifier with a primary or secondary amine group is used, then the reaction with a polyisocyanate almost exclusively occurs through the amino functionality. If an optional modifier with two similar hydroxy groups is used, the addition to the polyisocyanate can take place through both hydroxy groups. It is important that approximately one molecule of the optional modifier is provided for each isocyanate group to be reacted in order to avoid formation of unwanted crosslinked structures and so it can be advantageous to use a slight excess of optional modifier, preferably 10 mol % and more preferably 5 mol % is adequate.

Any hydroxy groups in the polyurethane dispersant may optionally be reacted with a polycarboxylic acid containing at least two carboxylic acid groups or anhydrides thereof under such conditions which substantially avoid cross-linking reactions or with polyphosphoric acid to give products with acidic functionality.

It is accepted that optional modifiers with several isocyanate reactive groups, such as hydroxy acids, amino acids, diols, triols, or amino alcohols as described above can also be used as optional cross-linkers and so the same compound can be used optionally before and after the addition of the imide compound of Formula 1b.

Specific examples of optional modifiers containing at least one alkoxysilyl group are 3-aminopropyltrimethoxysilane, 3-aminopropyltriethoxysilane, 3-mercaptopropyltrimethoxysilane, 4-aminophenyltriethoxysilane, 4-aminobutyltriethoxysilane, 4-aminobutyldimethylmethoxysilane, N— (2-aminoethyl)-3-aminopropyltrimethoxysilane, bis[3-(triethoxysilyl)propyl]amine and trimethoxysilylpropyldiethylenetriamine.

Preferably, optional modifiers containing heterocyclic groups obtainable by reacting an acrylate or epoxide with a heterocyclic ring system are compounds of formula J-X—Θ wherein J represents a heterocyclic ring structure containing at least one nitrogen atom, X is a chain containing at least three atoms and θ is a group $OR^5$ or $N(R^5)(R^6)$ wherein $R^5$ is H or a group $R^7$-$L^1$ wherein $R^7$ represents a chain with at least two atoms and $L^1$ is hydroxy or amino group and $R^6$ represents $R^7$-$L^1$. Preferably, X has a carbonyl group at the γ-position with respect to the group J, e. g. the compound is obtainable from an acrylate and the heterocyclic ring structure. The free acid of the heterocyclic compound (θ is OH) or its amide or ester can be used.

Preferred examples of optional modifiers containing heterocyclic groups obtainable by reacting an acrylate or epoxide with a heterocyclic ring system are the reaction products of hydroxyethyl and hydroxypropyl esters of (meth) acrylic acid with the heterocyclic ring structure wherein the following are attached to the nitrogen of the heterocyclic ring structure: propionic acid-2-hydroxyethylylester, propionic acid-2-hydroxypropylylester, 2-methylpropionic acid-2-hydroxyethylylester, and 2-methyl-propionic acid 2-hydroxypropylylester, and ethoxylated and/or propoxylated derivatives thereof. Acrylic acid esters are preferred.

Alternatively, the compound J-X-0 is obtainable by reacting an epoxide such as glycidol with the heterocyclic ring structure. When glycidol is used the heterocyclic ring structure contains a 1,2-dihydroxypropyl substituent attached to nitrogen.

Examples of the heterocyclic ring structures which are used to prepare the optional modifiers by reaction with an acrylate or epoxide are piperazine, imidazole, benzimidazole, imidazoline, pyrrolidine, pyrazole, 1,2,4-triazole, benzotriazole, indazole, 1-H-tetrazole, including substituted derivatives thereof. Preferred heterocycles are pyrrolidine, 1,2,4-triazole, pyrazole, imidazole and derivatives thereof.

Specific examples of the optional modifiers containing heterocyclic groups obtainable by reacting an acrylate or epoxide with a heterocyclic ring system are 3-benzimidazol-1-yl propionic acid-2-hydroxyethyl ester, 1,2-dihydroxy-3-benzimidazol-1-yl propane, 3-pyrazol-1-yl propionic acid-2-hydroxyethyl ester, 3-(2-phenyl-2-imidazol-1-yl) propionic acid-2-hydroxyethyl ester, 3-(1H, 2,4-triazol-1-yl) propionic acid-2-hydroxyethyl ester, 3-(1,2,4H-triazol-4-yl) propionic acid-2-hydroxyethyl ester, 3-(1H-benzotriazol-1-yl) propionic acid-2-hydroxyethyl ester, 3-(2H-benzotriazol-2-yl)(2H-benzotriazol-2-yl) propionic acid-2-hydroxyethyl ester, 3-imidazol-1-yl propionic acid-2-hydroxypropyl ester, and 3-(2-methylimidazol-1-yl) propionic acid-2-hydroxyethyl ester.

As with previous aspects of the invention, any isocyanate groups remaining in the urethane dispersant may be removed by reaction with simple amines and alcohols such as n-butanol, methanol or ethylamine.

All the reactions involving the polyisocyanate may be carried out by any method known to the art. Thus, they may be carried out in the presence of an inert solvent such as aliphatic or aromatic hydrocarbons, ethers and amides. Examples of specific solvents are xylene, dioxane and dimethylformamide. The reaction involving the isocyanate groups may also be carried out in the presence of a catalyst such as dibutyltin dilaurate, iron acetyl acetonate, diazabicyclooctane or triethylenediamine.

INDUSTRIAL APPLICATION

The particulate solid present in the composition may be any inorganic or organic solid material which is substantially insoluble in the organic medium at the temperature concerned and which it is desired to stabilize in a finely divided form therein. The particulate solids may be in the form of a granular material, a fibre, a platelet or in the form of a powder, often a blown powder. In one embodiment, the particulate solid is a pigment.

The particulate solid (typically a pigment or filler) may have an average particle size measured by light scattering measurements of from 10 nanometers to 10 microns, or 10 nanometers to 1, 2, 3, or 5 microns, or 20 nanometers to 1, 2, 3, or 5 microns in diameter.

Examples of suitable solids are pigments for solvent inks; pigments, extenders, fillers, blowing agents and flame retardants for paints and plastic materials; dyes, especially disperse dyes; optical brightening agents and textile auxiliaries for solvent dyebaths; pigments for inks, toners and other solvent application systems; solids for oil-based and inverse-emulsion drilling muds; dirt and solid particles in dry cleaning fluids; metals; particulate ceramic materials and magnetic materials for ceramics, piezoceramic printing, refactories, abrasives, foundry, capacitors, fuel cells, ferrofluids, conductive inks, magnetic recording media, water treatment and hydrocarbon soil remediation; organic and inorganic nanodisperse solids; metal, metal oxides and carbon for electrodes in batteries, fibres such as wood, paper, glass, steel, carbon and boron for composite materials; and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, trisazo, condensed azo, azo lakes, naphthol pigments, anthanthrone, anthrapyrimidine, anthraquinone, benzimidazolone, carbazole, diketopyrrolopyrrole, flavanthrone, indigoid pigments, indanthrone, isodibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, di sazos, indanthrones, anthranthrones, quinacridones, diketopyrrolopyrroles, perylenes and carbon blacks.

Examples of inorganic pigments include metallic oxides such as titanium dioxide, rutile titanium dioxide and surface coated titanium dioxide, titanium oxides of different colours such as yellow and black, iron oxides of different colours such as yellow, red, brown and black, zinc oxide, zirconium oxides, aluminium oxide, oxymetallic compounds such as bismuth vanadate, cobalt aluminate, cobalt stannate, cobalt zincate, zinc chromate and mixed metal oxides of two or more of manganese, nickel, titanium, chromium, antimony, magnesium, cobalt, iron or aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, aluminosilicates including nanoclays, kaolin, montmorillonites including bentonites, hectorites and saponites, ball clays including natural, synthetic and expandable, mica, talc including muscovites, phlogopites, lepidolites and chlorites, chalk, synthetic and precipitated silica, fumed silica, metal fibres and powders, zinc, aluminium, glass fibres, refractory fibres, carbon black including single- and multi-walled carbon nanotubes, reinforcing and non-reinforcing carbon black, graphite, Buckminsterfullerenes, asphaltene, graphene, diamond, alumina, quartz, perlite, pegmatite, silica gel, wood flour, wood flake including soft and hard woods, saw dust, powdered paper/fibre, cellulosic fibres such as kenaf, hemp, sisal, flax, cotton, cotton linters, jute, ramie, rice husk or hulls, raffia, typha reed, coconut fibre, coir, oil palm fibre, kapok, banana leaf, caro, curaua, henequen leaf, harakeke leaf, abaca, sugar cane bagasse, straw, bamboo strips, wheat flour, MDF and the like, vermiculite, zeolites, hydrotalcites, fly ash from power plants, icinerated sewage sludge ash, pozzolanes, blast furnace slag, asbestos, chrysotile, anthophylite, crocidolite, wollastonite, attapulgite and the like, particulate ceramic materials such as alumina, zirconia, titania, ceria, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g. barium ferrites; and metal particles, for instance metallic aluminium, iron, nickel, cobalt, copper, silver, gold, palladium, and platinum and alloys thereof.

Other useful solid materials include flame retardants such as pentabromodiphenyl ether, octabromodiphenyl ether, decabromodiphenyl ether, hexabromocyclododecane, ammonium polyphosphate, melamine, melamine cyanurate, antimony oxide and borates; biocides or industrial microbial agents such as those mentioned in tables 2, 3, 4, 5, 6, 7, 8 and 9 of the chapter entitled "Industrial Microbial Agents" in Kirk-Othmer's Encyclopedia of Chemical Technology, Volume 13, 1981, $3^{rd}$ Edition, and agrochemicals such as the fungicides flutriafen, carbendazim, chlorothalonil and mancozeb.

The organic medium present in the composition of the invention in one embodiment is a plastics material and in another embodiment an organic liquid. The organic liquid may be a non-polar or a polar organic liquid. By the term "polar" in relation to the organic liquid it is meant that an organic liquid is capable of forming moderate to strong bonds as described in the article entitled "A Three Dimensional Approach to Solubility" by Crowley et al in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, glycol ethers, glycol esters, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol (also known as 2-methylpropanol), terpineol and dialkyl and cyclic ethers such as diethyl ether and tetrahydrofuran. In one embodiment, solvents are alkanols, alkane carboxylic acids and esters of alkane carboxylic acids. In one embodiment, the present invention is suitable for organic liquids that are substantially non-soluble in an aqueous medium. Furthermore a person skilled in the art will appreciate that small quantities of an aqueous medium (such as glycols, glycol ethers, glycol esters and alcohols) may be present in the organic liquids provided the overall organic liquid is substantially non-soluble in an aqueous medium.

Examples of organic liquids, which may be used as polar organic liquids are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, medium oil alkyd, short oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g. toluene and xylene), halogenated aromatic hydrocarbons (e.g. chlorobenzene, dichlorobenzene, chlorotoluene), non-halogenated aliphatic hydrocarbons (e.g. linear and branched aliphatic hydrocarbons containing six or more carbon atoms both fully and partially saturated), halogenated aliphatic hydrocarbons (e.g. dichloromethane, carbon tetrachloride, chloroform, trichloroethane) and natural non-polar organics (e.g. vegetable oil, sunflower oil, rapeseed oil, linseed oil, terpenes and glycerides).

In one embodiment, the organic liquid comprises at least 0.1% by weight, or 1% by weight or more of a polar organic liquid based on the total organic liquid. The organic liquid optionally further comprises water. In one embodiment, the organic liquid is free of water.

The plastics material may be a thermosetting resin. The thermosetting resins useful in this invention include resins which undergo a chemical reaction when heated, catalyzed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, amino resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

In one embodiment, the thermosetting composite or thermosetting plastic may be a polyester, a polyvinyl acetate, a polyester resin in styrene, a polystyrene, or mixtures thereof.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and diphenylmethane diisocyanates.

If desired, the compositions of the present invention may contain other ingredients, for example resins (where these do not already constitute the organic medium), binders, co-solvents, cross-linking agents, fluidising agents, wetting agents, anti-sedimentation agents, plasticisers, surfactants, dispersants other than the compound of the present invention, humectants, anti-foamers, anti-cratering agents, rheology modifiers, heat stabilizers, light stabilizers, UV absorbers, antioxidants, leveling agents, gloss modifiers, biocides and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The compositions containing an organic liquid may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example by high speed mixing, ball milling, basket milling, bead milling, gravel milling, sand grinding, attritor grinding, two roll or three roll milling, plastic milling until the dispersion is formed. Alternatively, the solid may be treated to reduce its particle size independently or in admixture with either the organic medium or the dispersant, the other ingredient or ingredients then being added and the mixture being agitated to provide the composition. The composition can also be made by grinding or milling the dry solid with the dispersant and then adding the liquid medium or mixing the solid with the dispersant in a liquid medium in a pigment flushing process.

The composition of the present invention is particularly suited to liquid dispersions. In one embodiment, such dispersion compositions comprise:
  a) from 0.5 to 80 parts of a particulate solid;
  b) from 0.1 to 79.6 parts of a polymer of formula (1); and
  c) from 19.9 to 99.4 parts of an organic liquid and/or water;
wherein all relative parts are by weight and the amounts (a)+(b)+(c)=100.

In one embodiment, component a) comprises from 0.5 to 30 parts of a pigment and such dispersions are useful as (liquid) inks, paints and millbases.

If a composition is required comprising a particulate solid and a dispersant of Formula (1) in dry form, the organic liquid is typically volatile so that it may be readily removed from the particulate solid by a simple separation means such as evaporation. In one embodiment, the composition comprises the organic liquid.

If the dry composition consists essentially of the dispersant of formula (1) and the particulate solid, it typically contains at least 0.2%, at least 0.5% or at least 1.0% dispersant of formula (1) based on weight of the particulate solid. In one embodiment, the dry composition contains not greater than 100%, not greater than 50%, not greater than 20% or not greater than 10% by weight of dispersant of formula (1) based on the weight of the particulate solid.

As disclosed hereinbefore, the compositions of the invention are suitable for preparing millbases wherein the particulate solid is milled in an organic liquid in the presence of a compound for formula (1).

Thus, according to a still further aspect of the invention there is provided a millbase comprising a particulate solid, an organic liquid and a polymer of formula (1).

Typically, the millbase contains from 20 to 70% by weight particulate solid based on the total weight of the millbase. In one embodiment, the particulate solid is not less than 10 or not less than 20% by weight of the millbase. Such millbases may optionally contain a binder added either before or after milling.

In one embodiment, the binder is a polymeric material capable of binding the composition on volatilisation of the organic liquid.

Binders are polymeric materials including natural and synthetic materials. In one embodiment, binders include poly(meth)acrylates, polystyrenics, polyesters, polyurethanes, alkyds, polysaccharides such as cellulose, nitrocellulose, and natural proteins such as casein. The binder may be nitrocellulose. In one embodiment, the binder is present in the composition at more than 100% based on the amount of particulate solid, more than 200%, more than 300% or more than 400%.

The amount of optional binder in the millbase can vary over wide limits but is typically not less than 10%, and often not less than 20% by weight of the continuous/liquid phase of the millbase. In one embodiment, the amount of binder is not greater than 50% or not greater than 40% by weight of the continuous/liquid phase of the millbase.

The amount of dispersant in the millbase is dependent on the amount of particulate solid but is typically from 0.5 to 5% by weight of the millbase.

Dispersions and millbases made from the composition of the invention are particularly suitable for use in non-aqueous and solvent free formulations in which energy curable systems (ultra-violet, laser light, infra-red, cationic, electron beam, microwave) are employed with monomers, oligomers, etc. or a combination present in the formulation. They are particularly suitable for use in coatings such as paints, varnishes, inks, other coating materials and plastics. Suitable examples include their use in low, medium and high solids paints, general industrial paints including baking, two component and metal coating paints such as coil and can coatings, powder coatings, UV-curable coatings, wood varnishes; inks, such as flexographic, gravure, offset, lithographic, letterpress or relief, screen printing and printing inks for packaging printing, non impact inks such as inkjet inks including continuous inkjet and drop on demand inkjet which include thermal, piezo and electrostatic, phase change inks and hot melt wax inks, inks for ink-jet printers and print varnishes such as overprint varnishes; polyol and plastisol dispersions; non-aqueous ceramic processes, especially tape-casting, gel-casting, doctor-blade, extrusion and injection moulding type processes, a further example would be in the preparation of dry ceramic powders for isostatic pressing; composites such as sheet moulding and bulk moulding compounds, resin transfer moulding, pultrusion, hand-lay-up and spray-lay-up processes, matched die moulding; construction materials like casting resins, cosmetics, personal care like nail coatings, sunscreens, adhesives, toners such as liquid toners, plastics materials and electronic materials such as coating formulations for colour filter systems in displays including organic light-emitting diode (OLED) devices, liquid crystal displays and electrophoretic displays, glass coatings including optical fibre coatings, reflective coatings or anti-reflective coatings, conductive and magnetic inks and coatings. They are useful in the surface modification of pigments and fillers to improve the dispersibility of dry powders used in the above applications. Further examples of coating materials are given in Bodo Muller, Ulrich Poth, Lackformulierung und Lackrezeptur, Lehrbuch fr Ausbildung und Praxis, Vincentz Verlag, Hanover (2003) and in P. G. Garrat, Strahlenhartung, Vincentz Verlag, Hanover (1996). Examples of printing ink formulations are given in E. W. Flick, Printing Ink and Overprint Varnish Formulations—Recent Developments, Noyes Publications, Park Ridge N.J., (1990) and subsequent editions In one embodiment, the composition of the invention further includes one or more additional known dispersants.

EXAMPLES

Intermediate A

Dodecanol (80 parts), epsilon-caprolactone (343.02 parts), delta-valerolactone (300.89 parts) and zirconium butoxide (3.43 parts) were stirred under nitrogen at 175° C. for 16 hours. The resulting product was a waxy solid with Mn=1650 g/mole and Mw=2300 as determined by GPC (THF eluent, caprolactone standards).

Intermediate B

Dodecanol (54.77 parts), epsilon-caprolactone (318.48 parts), delta-valerolactone (103 parts) and zirconium butoxide (2.38 parts) were stirred under nitrogen at 175° C. for 16 hours. The resulting product was a waxy solid with Mn=1650 and Mw=2300 as determined by GPC (THF eluent, polycaprolactone standards).

Intermediate C

Dodecanol (111.58 parts), epsilon-caprolactone (786.02 parts) and titanium butoxide (1.6 parts) were stirred under nitrogen at 160° C. for 8 hours. The resulting product was a waxy solid with Mn=1560 and Mw=2200 as determined by GPC (THF eluent, polycaprolactone standards).

Intermediate D

Phenyl ethyl alcohol (11.1 parts), epsilon-caprolactone (88.9 parts) and dibutyl tin dilaurate (0.002 parts) were stirred under nitrogen for 7 hrs at 170° C. The resulting product was a waxy solid with Mn=1100 and Mw=3500 as determined by GPC (THF eluent, polystyrene standards).

Comparative Example 1 (CE1) CE1 is Similar but not Identical to the Composition of Example 2 in U.S. Pat. No. 4,762,752; (Tolonate™ HDLV2 Instead of Desmodur® NBoth are HDI Trimer; and 2-(2-hydroxyethyl)Pyridine Instead of 4-(2-hydroxyethyl) pyridine Intermediate D (15 parts) was dissolved in xylene (21.5 parts) and charged to a solution of polyisocyanate (7.4 parts, Tolonate™ HDT-LV2 ex Vencorex) in ethyl glycol diacetate (11.5 parts). Dibutyl tin dilaurate (0.004 parts) was added and the solution was heated to 60° C. under nitrogen until 33% of the NCO groups were reacted as determined by Infrared analysis (IR). Trimethylol propane (0.6 parts) was dissolved in xylene (30 parts) and then was added. Heating was continued until 66% of the NCO groups were reacted as determined by IR. Hydroxylethylpyridine (1.6 parts) in ethyl glycol acetate (12.4 parts) was added. The resulting product was a yellowish liquid at 26% solids, with Mn 3300 and Mw 7300 as determined by GPC (THF eluent, polystyrene standards).

Comparative Example 2 (CE2)

Polyisocyanate (20 parts Desmodur® L67 MPA/X ex Bayer) and propylene glycol monomethyl ether acetate (64.7 parts) were stirred under nitrogen at 50° C. Intermediate A (43 parts) and polyester diol (1.66 parts, CAPA®2047A ex Perstorp) were added. The mixture was heated at 90° C. for 1 hr. The mixture was cooled to 70° C. and 1-(3-aminopropyl)imidazole (2.84 parts) and propylene glycol monomethyl ether acetate (20 parts) were added. The mixture was stirred for 30 minutes at 70° C. until no isocyanate remained. The resulting product was a hazy liquid at 39.5% solids, with Mn=3100 and Mw=6500 as determined by GPC (THF eluent, polystyrene standards).

Comparative Example 3 (CE3) CE3 is Similar but not Identical to the Composition of Example 3 in U.S. Pat. No. 4,762,752, (Tolonate HDLV2 Instead of Desmodur N—Both are HDI Trimer) and 4-(2-Aminoethyl) Pyridine Replaced 1-(2-aminoethtyl)-Piperazine Poly(ethylene glycol)methyl ether (15 parts, Mn 750) was dissolved in xylene (15 parts) and charged to a solution of polyisocyanate (7.2 parts, Tolonate™ HDT-LV2 ex Vencorex) in xylene (1.5 parts)/ethyl glycol diacetate (21.5 parts). Dibutyl tin dilaurate (0.004 parts) was added and the solution was heated to 50° C. under nitrogen until 33% of the NCO groups were reacted as determined by IR. Polyethylene glycol (6.1 parts, Mn 900) dissolved in xylene (15 parts) was then added and heating at 50° C. continued until 66% of the NCO groups were reacted as determined by IR. 4-(2-Aminoethyl) pyridine (1.6 parts) was dissolved in ethylene glycol diacetate (10 parts) and then added to the reaction mixture. The reaction mixture was heated to 70° C. for 2 hrs until no isocyanate remains. The resulting product was a yellowish liquid at 26% solids with Mn 2000 and Mw 3000 as determined by GPC (THF eluent, polystyrene standards).

Comparative Example 4 (CE4)

Succinic anhydride (4.21 parts) was charged to a stirred solution of 2-(2-aminoethoxy)ethanol (4.45 parts) in poly(ethylene glycol)methyl ether (40.33 parts, Mn=750) at 120° C. under nitrogen for 1 hour. The reaction was cooled to 90° C. and poly(ethylene glycol)methyl ether (31.05 parts, Mn=750) was added followed by polyisocyanate (25 parts Tolonate™ HDT-LV2 ex Vencorex). The reaction mixture was heated for 4 hrs under nitrogen at 90° C., then diazobicyclo[5.4.0]undec-7-ene (0.1 parts) was charged and the reaction mixture was heated at 90° C. for 16 hrs and 120° C. for 3 hrs until no isocyanate remained. The product was diluted with water (105.04 parts) to 50.6% solids. The resulting product was a hazy brown liquid with Mn=4700 and Mw=9100 as determined by GPC (THF eluent, polystyrene standards).

Example 1 (EX1)

1,8-Naphthalic anhydride (2.27 parts) was charged to a stirred solution of 2-(2-aminoethoxy)ethanol (1.32 parts) in propylene glycol monomethyl ether acetate (50 parts) at 120° C. under nitrogen. The reaction mixture was stirred at 120° C. for 4.5 hours until no anhydride remained (as determined by IR). The reaction was cooled to 70° C. and Intermediate A (48.17 parts), caprolactone diol (3.34 parts, CAPA®2047A ex Perstorp), polyisocyanate (20 parts Desmodur® L67 MPA/X ex Bayer) and propylene glycol monomethyl ether acetate (45.98 parts) were added. The mixture was heated at 70° C. under nitrogen for 13 hours until no isocyanate remained. The resulting product was a hazy yellow liquid with Mn=4600 g/mole and Mw=13000 as determined by GPC (THF eluent, polystyrene standards).

Example 2 (EX2)

3-Nitro-1,8-naphthalic anhydride (2.78 parts) was charged to a stirred solution of 2-(2-aminoethoxy)ethanol (1.20 parts) in propylene glycol monomethyl ether acetate (50 parts) at 120° C. under nitrogen. The reaction was stirred at 120° C. for 10.5 hours until no anhydride remained (as determined by IR). The reaction was cooled to 70° C. and Intermediate A (48.17 parts), caprolactone diol (3.34 parts, CAPA®2047A ex Perstorp), polyisocyanate (20 parts Desmodur® L67 MPA/X ex Bayer) and propylene glycol monomethyl ether acetate (46.75 parts) were added. The mixture was heated at 70° C. under nitrogen for 2.5 hours, then dibutyltin dilaurate (0.21 parts) was added and the reaction mixture was stirred at 120° C. for a further 5.0 hours until no isocyanate remained. The resulting product was a clear red liquid with Mn=6800 and Mw=15600 as determined by GPC (THF eluent, polystyrene standards).

Example 3 (EX3)

1,8-Naphthalic anhydride (7.22 parts) was charged to a stirred solution of 2-(2-aminoethoxy)ethanol (3.90 parts) in propylene glycol monomethyl ether acetate (57.76 parts) at 120° C. under nitrogen. The reaction mixture was stirred at 146° C. for 6.5 hours until no anhydride remained (as determined by IR). The reaction mixture was cooled to 90° C. and Intermediate A (20.47 parts), polyisocyanate (17 parts Desmodur® L67 MPA/X ex Bayer) and 1,8-diazobicyclo[5.4.0]undec-7-ene (0.1 parts) were added. The mixture was heated at 90° C. under nitrogen for 1 hours until no isocyanate remained. The resulting product was a hazy yellow liquid at 40.1% solids with Mn=1500 and Mw=3100 as determined by GPC (THF eluent, polystyrene standards).

Example 4 (EX4)

1,8-Naphthalic anhydride (2.26 parts) was charged to a stirred solution of 2-(2-aminoethoxy)ethanol (1.24 parts) in propylene glycol monomethyl ether acetate (40 parts) at 120° C. under nitrogen. The reaction mixture was stirred at 120° C. for 1 hours until no anhydride remained (as determined by IR). The reaction mixture was cooled to 90° C. and Intermediate a (44.98 parts), polyisocyanate (20 parts Desmodur® IL BA ex Bayer) and propylene glycol monomethyl ether acetate (8.86 parts) were added and the mixture was stirred for 2.5 hrs at 90° C. 1,8-Diazobicyclo[5.4.0]undec-7-ene (0.17 parts) was added and the mixture was heated at 90° C. under nitrogen for 1 hours until no isocyanate remained. The resulting product was a hazy yellow liquid at 50.3% solids with Mn=5300 and Mw=12600 as determined by GPC (THF eluent, polystyrene standards).

Example 5 (EX5)

1,8-Naphthalic anhydride (3.68 parts) was charged to a stirred solution of 2-(2-aminoethoxy)ethanol (1.99 parts) in propylene glycol monomethyl ether acetate (58.11 parts) at 120° C. under nitrogen. The reaction was stirred at 120° C. for 6 hours and 145° C. for 4.5 hrs until no anhydride remained (as determined by IR). The reaction mixture was cooled to 90° C. and Intermediate B (27.23 parts), polyester diol (0.37 parts CAPA®2043 ex Solvay), polyisocyanate (13 parts Desmodur® L67 MPA/X ex Bayer) and 1,8-diazobicyclo[5.4.0]undec-7-ene(0.1 parts) were added and the mixture was stirred at 90° C. under nitrogen for 1 hours until no isocyanate remained. The resulting product was a hazy yellow liquid at 42% solids with Mn=3000 and Mw=6700 as determined by GPC (THF eluent, polystyrene standards).

Example 6 (EX6)

1,8-Naphthalic anhydride (1.13 parts) was charged to a stirred solution of 2-(2-aminoethoxy)ethanol (0.61 parts) in propylene glycol monomethyl ether acetate (40 parts) at 120° C. under nitrogen. The reaction mixture was stirred at 120° C. for 1 hours until no anhydride remained (as determined by IR). The reaction mixture was cooled to 90° C. and Intermediate B (43.31 parts), polyester diol (2.81 parts CAPA 2100 ex Solvay), polyisocyanate (20.01 parts Desmodur® IL BA ex Bayer) and propylene glycol monomethyl ether acetate (8.23 parts) were added and the mixture was stirred at 90° C. under nitrogen for 6 hours. Diazobicyclo[5.4.0]undec-7-ene (0.16 parts) was then added and the mixture was stirred at 90° C. under nitrogen for 1 hour until no isocyanate remained. The resulting product was a hazy yellow liquid at 51.9% solids with Mn=7500 and Mw=17200 as determined by GPC (THF eluent, polystyrene standards).

Example 7 (EX7)

1,8-Naphthalic anhydride (2.64 parts) was charged to a stirred solution of 2-(2-aminoethoxy)ethanol (1.45 parts) in propylene glycol monomethyl ether acetate (30 parts) at 120° C. under nitrogen. The reaction mixture was stirred at 120° C. for 1 hours until no anhydride remained (as determined by IR). The reaction was cooled to 90° C. and Intermediate B (30.91 parts), polyester diol (2.87 parts CAPA® 2100 ex Solvay), polyisocyanate (20.03 parts Desmodur® ILBA ex Bayer) and propylene glycol monomethyl ether acetate (8.21 parts) were added and the mixture was stirred at 90° C. under nitrogen for 6 hours. Diazobicyclo[5.4.0]undec-7-ene (0.15 parts) was then added and the mixture was stirred at 90° C. under nitrogen for 1 hour until no isocyanate remained. The resulting product was a hazy yellow liquid at 50.32% solids with Mn=5700 and Mw=14100 as determined by GPC (THF eluent, polystyrene standards).

Example 8 (EX8

1,8-Naphthalic anhydride (1.13 parts) was charged to a stirred solution of 3-amino-1,2-propanediol (0.56 parts) in propylene glycol monomethyl ether acetate (40 parts) at 120° C. under nitrogen. The reaction mixture was stirred at 120° C. for 1 hour until no anhydride remained (as determined by IR). The reaction mixture was cooled to 90° C. and Intermediate B (43.27 parts), polyisocyanate (20.00 parts Desmodur® IL BA ex Bayer) and propylene glycol monomethyl ether acetate (5.34 parts) were added and the mixture was stirred at 90° C. under nitrogen for 1 hour. Diazobicyclo[5.4.0]undec-7-ene (0.23 parts) was then added and the mixture was stirred at 90° C. under nitrogen for 1 hour until no isocyanate remained. The resulting product was a hazy yellow liquid at 50.4% solids with Mn=11200 and Mw=22100 as determined by GPC (THF eluent, polystyrene standards).

Example 9 (EX9

1,8-Naphthalic anhydride (3.68 parts) was charged to a stirred solution of 2-(2-aminoethoxy)ethanol (1.99 parts) in propylene glycol monomethyl ether acetate (45 parts) at 120° C. under nitrogen. The reaction mixture was stirred at 120° C. for 5 hours and then 146° C. for 5.5 hours until no anhydride remained (as determined by IR). The reaction mixture was cooled to 90° C. and Intermediate C (27.86 parts), polyisocyanate (13 parts Desmodur® L 67 MPA/X ex Bayer), Diazobicyclo[5.4.0]undec-7-ene (0.15 parts) and propylene glycol monomethyl ether acetate (13.5 parts) were added and the mixture was stirred at 90° C. under nitrogen for 1 hour until no isocyanate remained. The resulting product was a hazy yellow liquid at 47.8% solids with Mn=3000 and Mw=6400 as determined by GPC (THF eluent, polystyrene standards).

Example 10 (EX10

1,8-Naphthalic anhydride (8.14 parts) was charged to a stirred solution of 2-(2-aminoethoxy)ethanol (4.41 parts) in poly(ethylene glycol)methyl ether (40 parts, Mn=750) at 120° C. under nitrogen for 1 hour. The reaction mixture was cooled to 90° C. and poly(ethylene glycol)methyl ether (31.88 parts, Mn=750) was added followed by polyisocyanate (25 parts Tolonate™ HDT-LV2 ex Vencorex). The reaction mixture was heated for 6 hrs under nitrogen at 90° C., then diazobicyclo[5.4.0]undec-7-ene (0.1 parts) was charged and the reaction mixture was heated at 90° C. for 1 hr until no isocyanate remained. The product was diluted with water (109.43 parts) to 50% solids. The resulting product was a hazy brown liquid with Mn=4300 and Mw=6600 as determined by GPC (THF eluent, polystyrene standards).

Example 11 (EX11

1,8-Naphthalic anhydride (15.95 parts) was charged to a stirred solution of 2-(2-aminoethoxy)ethanol (8.64 parts) in poly(ethylene glycol)methyl ether (36.75 parts, Mn=750) at 120° C. under nitrogen for 1 hour. The reaction mixture was cooled to 90° C. and poly(ethylene glycol) (9.19 parts, Mn=1000) was added followed by polyisocyanate (31.10 parts Tolonate™ HDT-LV2 ex Vencorex). The reaction mixture was heated for 16 hrs under nitrogen at 90° C., then 120° C. for 3 hrs until no isocyanate remained. The product was diluted with water (101.63 parts) to 50% solids. The resulting product was a hazy brown liquid with Mn=3000 and Mw=7800 as determined by GPC (THF eluent, polystyrene standards).

Example 12 (EX12

1,8-Naphthalic anhydride (8.14 parts) was charged to a stirred solution of 2-(2-aminoethoxy)ethanol (4.47 parts) in poly(ethylene glycol)methyl ether (71.65 parts, Mn=1000) at 120° C. under nitrogen for 1 hour. The reaction mixture was cooled to 90° C. and poly(ethylene glycol)methyl ether (24.19 parts, Mn=1000) was added followed by polyisocyanate (25 parts Tolonate™ HDT-LV2 ex Vencorex). The reaction mixture was heated for 2 hrs under nitrogen at 90°

C., then 120° C. for 2 hrs until no isocyanate remained. The product was diluted with water (133.45 parts) to 50% solids The resulting product was a hazy brown liquid with Mn=3000 and Mw=6500 as determined by GPC (THF eluent, polystyrene standards).

Dispersion Testing 1

A dispersion was prepared by dissolving CE1, CE2, EX1 or EX2 (4.75 parts based on 40% active) in acrylic resin (1.05 parts, Macrynal® SMC565 ex Cytec) and propylene glycol monomethyl ethyl acetate (20.45 parts). Glass beads, 3 mm (125 parts) and blue pigment (8.75 parts, Heliogen® Blue L6700F ex BASF) were added and the contents were milled on a Skandex shaker for 4 hours. Lower particle size averages were achieved in the presence of EX1 or EX2 than CE1 or CE2. Particle size averages D50 and D90 were determined using a Nanotrac particle size analyser.

TABLE 1

| Dispersant | Viscosity | Particle size average D50/nm | Particle size average D90/nm |
|---|---|---|---|
| No dispersant | Gelled | 383 | 907 |
| CE1 | Gelled | 345 | 726 |
| CE2 | Fluid | 286 | 488 |
| EX1 | Fluid | 251 | 338 |
| EX2 | Fluid | 253 | 359 |

Dispersion Testing 2

Dispersions were prepared by dissolving each of the dispersants CE1, CE3 or EX3-9 (1.0 parts by wt. based on 50% active) in butyl acetate (7 parts). Glass beads, 3 mm diameter, 17 parts and red pigment (Cromopthal® Red A2B ex BASF, 2.0 parts) were added and the contents were milled on a horizontal shaker for 16 hrs. The viscosity of the resulting mill bases was determined by the freedom of the glass beads to move throughout the mill base. All the inventive examples exhibited excellent fluidity whereas CE1 and CE3 formed dispersions that gel on standing.

TABLE 2

| Example | Viscosity |
|---|---|
| CE1 | Very viscous |
| CE3 | Viscous - gels on standing |
| EX3 | Very fluid |
| EX4 | Very fluid |
| EX5 | Very fluid |
| EX6 | Very fluid |
| EX7 | Very fluid |
| EX8 | Fluid |
| EX9 | Very fluid |

Dispersion Testing 3

Dispersions were prepared by dissolving each of the dispersants 10-12 (1.0 parts based on 50% active) in water (7 parts). Glass beads, 3 mm diameter, 17 parts and red pigment (Inkjet Magenta E5B02 ex Clariant, 2.0 parts) were added and the contents were milled on a horizontal shaker for 16 hrs. The viscosity of the resulting mill bases was determined by the freedom of the glass beads to move throughout the millbase. All the inventive examples exhibited excellent fluidity whereas CE3 and CE4 form a dispersion that was viscous or gelled on standing. The particle size of the dispersions were determined using a Malvern Zetasizer.

TABLE 3

| Example | Viscosity | Particle size average D50/nm | Particle size average D90/nm |
|---|---|---|---|
| CE3 | Viscous - gels on standing | 323 | 743 |
| CE4 | Viscous liquid | 199 | 502 |
| EX10 | Very fluid | 174 | 376 |
| EX11 | Very fluid | 151 | 246 |
| EX12 | Fluid | 162 | 279 |

Dispersion Testing 4

Dispersions were prepared by dissolving each of the dispersants EX10-12 (2.0 parts based on 50% active) in water (6.5 parts). Glass beads, 3 mm diameter, 17 parts and black pigment (Raven 5000 Ultra ex Birla carbon, 1.5 parts) were added and the contents were milled on a horizontal shaker for 16 hrs. The viscosity of the resulting mill bases was determined by the freedom of the glass beads to move throughout the millbase. All the inventive examples exhibit excellent fluidity whereas CE3 and CE4 formed dispersions that were viscous liquids or gelled on standing. The particle size of the dispersions were determined using a Malvern Zetasizer.

TABLE 4

| Example | Viscosity | Particle size average D50/nm | Particle size average D90/nm |
|---|---|---|---|
| CE3 | Viscous - gels on standing | 199 | 450 |
| CE4 | Viscous liquid | 223 | 395 |
| EX10 | Very fluid | 174 | 276 |
| EX11 | Very fluid | 144 | 248 |
| EX12 | Very fluid | 174 | 296 |

Example 13

1,8-Naphthalic anhydride (8.18 parts) was charged to a stirred solution of 2-(2-aminoethoxy)ethanol (4.34 parts) in poly(ethylene glycol)methyl ether (52.18 parts, Mn=750) at 120° C. under nitrogen for 1 hour. Dimethylolpropionic acid (1.83 parts) was charged to the flask and the reaction mixture was cooled to 90° C. and polyisocyanate (24.72 parts Tolonate™ HDT-LV2 ex Vencorex) was added. The reaction mixture was heated for 4 hrs under nitrogen at 90° C. The resulting product was diluted with water (91.25 parts) to 49.8% solids. The resulting product was a yellow liquid with Mn=2700 and Mw=9200 as determined by GPC (THF eluent, polystyrene standards).

Example 14

1,8-Naphthalic anhydride (8.19 parts) was charged to a stirred solution of 2-(2-aminoethoxy)ethanol (4.38 parts) in poly(ethylene glycol)methyl ether (42.69 parts, Mn=750) at 120° C. under nitrogen for 1 hour. Dimethylolpropionic acid (2.72 parts) was charged to the flask and the reaction mixture was cooled to 90° C. and polyisocyanate (25.55 parts Tolonate™ HDT-LV2 ex Vencorex) was added. The reaction mixture was heated for 4 hrs under nitrogen at 90° C. The resulting product was diluted with water (83.53 parts) to 49.8% solids. The resulting product was a yellow liquid with Mn=3100 and Mw=9400 as determined by GPC (THF eluent, polystyrene standards).

Example 15

3-Nitro-1,8-naphthalic anhydride (6.08 parts) was charged to a stirred solution of 2-(2-aminoethoxy)ethanol (2.65 parts) in poly(ethylene glycol)methyl ether (25.16 parts, Mn=750) at 120° C. under nitrogen for 1 hour. Dimethylolpropionic acid (1.78 parts) was charged to the flask and the reaction mixture was cooled to 90° C. and polyisocyanate (15 parts Tolonate™ HDT-LV2 ex Vencorex) was added. The reaction mixture was heated for 8 hrs under nitrogen at 90° C. The resulting product was diluted with water (50.67 parts) to 55.0% solids. The resulting product was a dark brown liquid with Mn=3400 and Mw=5200 as determined by GPC (THF eluent, polystyrene standards).

Dispersion Testing 5

A dispersion was prepared by dissolving Example 13,14, and 15, (15.12 parts at 50% active), humectant (2.0 parts GRB3 ex Lubrizol) and wetting agent (0.4 parts eChem DF1519 ex eChem Ltd) in water (11.68 parts). 3 mm glass beads (125 parts) and carbon black pigment (10.8 parts, Raven® 5000 Ultra® II ex Birla Carbon) was added and the contents were milled on a Skandex shaker for 4 hours. To example 15 only was added a further 5 parts water. The viscosity of the resulting dispersions were measured on a Bohlin V88 Viscometer at a shear rate from 37.6 to 2392 $S^{-1}$. The dispersions were placed in an oven at 40° C. for 1 week and the viscosity measurement repeated.

TABLE 5

| Dispersant | Initial mill base viscosity of dispersion (Pa · S) at 37.6 s−1 | Mill base viscosity of dispersion after 1 week at 40° C. (Pa · S) at 37.6 s−1 |
| --- | --- | --- |
| Example 13 | 0.400 | 0.482 |
| Example 14 | <0.300 | 0.382 |
| Example 15 | <0.300 | <0.300 |

Before storage, the resulting dispersions for Ex13,14, and 15 (1.0 parts) were let down into a thermosetting acrylic resin (7.75 parts, Setaqua 6160 ex Nuplex). The resulting let downs were drawn down onto black and white card using a number 4 K-bar and air dried for 2 hours then dried in an oven at 120° C. for 20 minutes. The gloss and haze of the drawdowns measured using a Byk-Gardner haze-gloss meter. The coatings exhibited high gloss values and low haze.

TABLE 6

| Example | 60° gloss of coating | 20° gloss of coating | Haze value of coating |
| --- | --- | --- | --- |
| 13 | 90.7 | 80.6 | 33.8 |
| 14 | 91.5 | 83.2 | 31.3 |
| 15 | 86.6 | 71.1 | 111.0 |

Dispersion Testing 6

A dispersion was prepared by dissolving Example 13 and 14 (10.08 parts), Humectant (2.24 parts GRB3 ex Lubrizol) and wetting agent (0.6 parts eChem-1290 ex eChem Ltd) in water (11.07 parts). 3 mm glass beads (125 parts) and yellow pigment (36 parts, Bayferrox® yellow 3920 ex Lanxess) was added and the contents were milled on a Skandex shaker for 1 hour. The viscosity of the resulting dispersion was measured on a Bohlin V88 viscometer at a shear rate of 37.6 $S^{-1}$ then again after storage in an oven for 2 weeks at 40° C.

TABLE 7

| Dispersant | Initial mill base viscosity of dispersion (Pa · S) | Mill base viscosity of dispersion after 2 weeks at 40° C. (Pa · S) at 37.6 s−1 |
| --- | --- | --- |
| Example 13 | 1.450 | 2.803 |
| Example 14 | 1.130 | 2.028 |

Before storage, the resulting dispersions for Ex 13 and 14 (1.12 parts) were let down into a thermosetting acrylic resin (3.9 parts, Setaqua 6160 ex Nuplex). The resulting let downs were drawn down onto black and white card using a number 4 K-bar and air dried for 2 hours then dried in an oven at 120° C. for 20 minutes. The gloss and haze of the drawdowns measured using a Byk-Gardner haze-gloss meter. The coatings exhibited high gloss values and low haze.

TABLE 8

| Example | 60° gloss of coating | 20° gloss of coating | Haze value of coating |
| --- | --- | --- | --- |
| 13 | 89.9 | 83.8 | 52 |
| 14 | 89.3 | 81.9 | 67 |

Each of the documents referred to above is incorporated herein by reference, including any prior applications, whether or not specifically listed above, from which priority is claimed. It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, non-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A polymer comprising a polymer chain having at least three imide groups, wherein each imide group is chemically bonded to an aromatic ring, the polymer is represented by Formula (1):

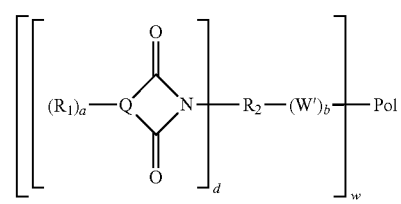

Formula (1)

wherein each variable is independently

R$_1$ is a non-hydrogen substituent and R$_1$ is independently represented by one or more of an electron withdrawing selected from the group —NO$_2$, —SO$_2$NR'$_2$, —C(O)R', —SO$_3$M, halogen, —NH$_2$, and OR', or an electron releasing alkyl group of 1 to 3 carbon atoms, the number of non-H substituted groups on Q defined by a is from 0 to 2; wherein M is H, a metal cation, NR'$_4^+$, or mixtures thereof; R' is H or an optionally-substituted alkyl typically containing 1 to 20, and the optional substituent of R', when present, is hydroxyl or halogen or mixtures thereof;

Q is a fused or non-fused aromatic ring containing 4n+2 π-electrons, wherein n=1 or more, and Q is bonded to the imide group in such a way to form a 5 or 6 membered imide ring;

b is 1 or 2, and when b is 2 the imide group is a side chain attached to Pol by two chemical bonds;

d is 1, 2, or 3; and the imide groups are optionally attached to R$_2$ at different carbon atoms of R$_2$;

R$_2$ is a C$_1$ to C$_{20}$ hydrocarbylene group or a C$_1$ to C$_{20}$ hydrocarbonylene group or mixtures thereof; R$_2$ optionally includes oxygen and/or nitrogen atoms wherein there is at least 2 carbon atoms per every oxygen or nitrogen of R$_2$;

W' is a nitrogen atom, an oxygen atom or a direct bond; when b is 2 then one of the W' is derived from a secondary amine reacted with said isocyanate and be in the R$_2$ linking group between the imide and the other W' group, when b is 2, each W' group is the same or different;

Pol is a polyurethane comprising at least two urethane and/or urea linkages and at least one of polyether, polyester, polyolefin and polyacrylate terminal chains, or mixtures of said terminal chains; wherein said at least one of polyether, polyester, polyolefin and polyacrylate terminal chains have a number average molecular weight of 700-4000 g/mole; wherein said polyurethane is from a polyisocyanate having isocyanate functionality of three or more, and w is 1 or more.

2. The polymer of claim 1 which is obtained by a process comprising:
a) sourcing a polyisocyanate molecule having at least three reactive isocyanate groups,
b) reacting at least one of said reactive isocyanate groups of said polyisocyanate molecule with at least one polyether, polyester, polyolefin and polyacrylate to form a terminal chain,
c) reacting at least one of said reactive isocyanate groups of said polyisocyanate with an imide group containing molecule of the formula

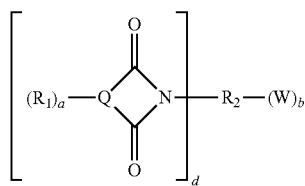

wherein b is 1 or 2 and d is 1, 2 or 3; and R$_1$, Q, R$_2$, and a, are as previously defined; to attach said imide groups to said Pol, W is any group capable of reaction with an isocyanate group, c) optionally reacting said reactive isocyanate groups of said polyisocyanate molecule with at least one difunctional or higher crosslinking agent to couple multiple isocyanate groups into a single Pol, d) optionally reacting said reactive isocyanate groups of said polyisocyanate molecule with at least one modifier for said Pol.

3. The polymer of claim 2, wherein the polymer contains up to 30 imide groups of formula

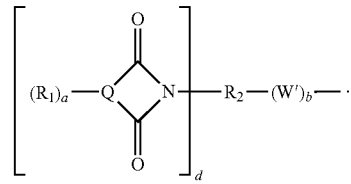

4. The polymer according to claim 2, wherein an optional additional modifier is reacted with up to 10 mol % of reactive isocyanate groups of said polyisocyanate.

5. The polymer according to claim 2, wherein said polyisocyanate molecule having at least three reactive isocyanate groups is selected from a commercially available polyisocyanate, a dimerized or trimerized polyisocyanate; a diisocyanate and/or polyisocyanate reacted with a polyol, polyamine or amino alcohol having two or more groups reactive with isocyanate groups.

6. The polymer of claim 1, wherein said Q group is a single benzene ring or a naphthalene ring.

7. The polymer of any of claim 1, wherein said at least one of polyether, polyester, polyolefin and polyacrylate has at least one chemical group that is reactive with isocyanate groups to form a chemical bond at one end of the molecule but does not have a second distally located chemical group that is reactive with isocyanate groups to form a chemical bond and therefore creates a polyether, polyester, polyolefin or polyacrylate that is only attached to the polymer at one point and any additional ends of said polyether, polyester, polyolefin or polyacrylate function as a chain end.

8. The polymer of claim 1, wherein said polyether, polyester, polyolefin or polyacrylate used in said Pol comprise from about 20 to about 80 wt. % of said polymer.

9. The polymer of claim 1, wherein said polymer has at least two three imide groups having the formula

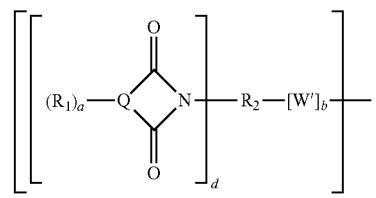

attached to Pol at least two separate locations on said Pol.

10. The polymer of claim 1, wherein said

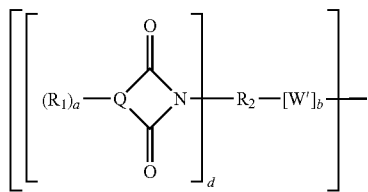

is derived from a reactant of the structure

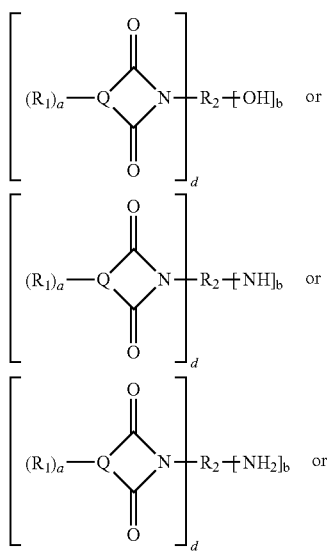

-continued

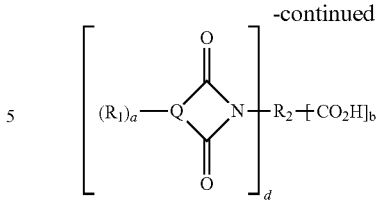

wherein $R_1$, $R_2$, Q, d, b, and a are as previously defined in claim 1.

11. The polymer according to claim 1, wherein Q is naphthalene.

12. The polymer according to claim 1, wherein on average at least one $R_1$ per polymer is a $SO_3H$, —Cl, —Br, —$NO_2$ group.

13. A composition comprising a) a particulate solid, b) a medium comprising a polar organic or a nonpolar organic medium, or an aqueous medium, and c) a polymer represented by claim 1.

14. The composition of claim 13, wherein the composition is a millbase, paint or ink.

15. A composition comprising a polymer chain having at least one terminal imide group said imide groups being chemically bound to an aromatic group or a fused aromatic group, wherein the polymer is represented by claim 1, a particulate solid, and (i) a polar organic medium, (ii) a non-polar organic medium, (iii) water, or blends thereof.

* * * * *